(12) United States Patent
Perlo et al.

(10) Patent No.: US 10,457,330 B2
(45) Date of Patent: Oct. 29, 2019

(54) ELECTRIC MOTOR VEHICLE FOR TRANSPORT OF GOODS MADE OF A ROTOMOULDED BODY SUPPORTED BY A MODULAR TUBULAR FRAME

(71) Applicants: INTERACTIVE FULLY ELECTRICAL VEHICLES S.R.L., Sommariva del Bosco (IT); POLI-MODEL S.R.L., Moncalieri (IT)

(72) Inventors: Pietro Perlo, Rivoli (IT); Pietro Guerrieri, Rivoli (IT)

(73) Assignees: Interactive Fully Electrical Vehicles S.R.L., Sommariva del Bosco (CN) (IT); Poli-Model S.R.L., Moncelieri (TO) (IT)

( * ) Notice: Subject to any disclaimer, the term of this patent is extended or adjusted under 35 U.S.C. 154(b) by 7 days.

(21) Appl. No.: 15/518,181

(22) PCT Filed: Jun. 3, 2015

(86) PCT No.: PCT/IB2015/054204
§ 371 (c)(1),
(2) Date: Apr. 10, 2017

(87) PCT Pub. No.: WO2016/055874
PCT Pub. Date: Apr. 14, 2016

(65) Prior Publication Data
US 2018/0237076 A1 Aug. 23, 2018

(30) Foreign Application Priority Data

Oct. 8, 2014 (IT) .............................. TO2014A0805

(51) Int. Cl.
*B62D 23/00* (2006.01)
*B60K 1/00* (2006.01)
(Continued)

(52) U.S. Cl.
CPC ............ *B62D 23/005* (2013.01); *B29C 39/08* (2013.01); *B29C 39/10* (2013.01); *B60K 1/02* (2013.01);
(Continued)

(58) Field of Classification Search
CPC .. B62D 23/005; B62D 27/065; B62D 29/005; B62D 29/002; B62D 29/048; B62D 21/08; B62D 21/11; B62D 21/183; B60K 1/00
See application file for complete search history.

(56) References Cited

U.S. PATENT DOCUMENTS 1,523,636 A * 1/1925 Dunn .................. B62D 23/005
296/203.01
3,686,051 A * 8/1972 Samuel et al. .......... B29C 51/34
156/212
(Continued)

FOREIGN PATENT DOCUMENTS

CA     2 717 163 A     4/2012
CN     102328702 A    1/2012
(Continued)

OTHER PUBLICATIONS

International Search Report dated Nov. 17, 2015, issued in PCT Application No. PCT/IB2015/054204, filed Jun. 3, 2015.
(Continued)

*Primary Examiner* — Frank B Vanaman
(74) *Attorney, Agent, or Firm* — Workman Nydegger

(57) ABSTRACT

An electrically powered motor vehicle for transport of goods, of the minivan type, includes a main frame, a front axle assembly and a rear axle assembly. The main frame includes a front frame subassembly, a floor-panel subassembly, a rear frame subassembly, and a top frame subassembly. Each of these frame subassemblies includes a lattice struc-
(Continued)

ture including box-section elements made of steel, preferably high-strength steel. Each of the frame subassemblies is prearranged for being preassembled separately and subsequently assembled together with the other subassemblies so as to constitute the main frame. The structure is such as to afford high flexibility of production, and presents at the same time considerable safety characteristics, thanks to a high capacity of absorption of impact energy. The motor vehicle is equipped with a transporting body having a hollow-walled body made of plastic material, filled with foamed plastic material, preferably obtained with the rotational-molding technique.

7 Claims, 29 Drawing Sheets

(51) Int. Cl.
| | | |
|---|---|---|
| B62D 21/11 | (2006.01) | |
| B62D 29/04 | (2006.01) | |
| B62D 63/02 | (2006.01) | |
| B62D 29/00 | (2006.01) | |
| B29C 39/08 | (2006.01) | |
| B29C 39/10 | (2006.01) | |
| B60K 1/02 | (2006.01) | |
| B60K 1/04 | (2019.01) | |
| B60K 17/354 | (2006.01) | |
| B62D 33/04 | (2006.01) | |
| B60L 50/60 | (2019.01) | |
| B29K 75/00 | (2006.01) | |
| B29L 31/30 | (2006.01) | |

(52) U.S. Cl.
CPC .............. *B60K 1/04* (2013.01); *B60K 17/354* (2013.01); *B60L 50/66* (2019.02); *B62D 21/11* (2013.01); *B62D 29/005* (2013.01); *B62D 29/043* (2013.01); *B62D 33/044* (2013.01); *B62D 63/025* (2013.01); *B29K 2075/00* (2013.01); *B29L 2031/3002* (2013.01); *B60K 1/00* (2013.01); *B60K 2001/001* (2013.01); *B60K 2001/0438* (2013.01); *B60L 2200/36* (2013.01); *B60Y 2200/91* (2013.01); *Y02T 10/7005* (2013.01); *Y02T 10/705* (2013.01)

(56) References Cited

U.S. PATENT DOCUMENTS

| | | | | |
|---|---|---|---|---|
| 3,693,745 | A * | 9/1972 | Petrov ...................... | B60K 1/00 |
| | | | | 105/52 |
| 3,815,307 | A * | 6/1974 | Tantlinger .............. | B62D 31/02 |
| | | | | 296/178 |
| 4,595,230 | A * | 6/1986 | Fettes ........................ | B60J 7/08 |
| | | | | 29/401.1 |
| 5,401,056 | A * | 3/1995 | Eastman ................... | B60G 3/20 |
| | | | | 280/785 |
| 5,678,646 | A * | 10/1997 | Fliege ..................... | B60L 11/12 |
| | | | | 180/65.1 |
| 6,250,410 | B1* | 6/2001 | Balestrini ............... | B60N 2/01 |
| | | | | 180/299 |
| 6,309,012 | B1* | 10/2001 | Fryk ................. | B60H 1/00378 |
| | | | | 296/102 |
| 2002/0175008 | A1* | 11/2002 | Angerer ................... | B60K 1/00 |
| | | | | 180/65.1 |
| 2012/0175897 | A1 | 7/2012 | Rawlinson et al. | |

FOREIGN PATENT DOCUMENTS

| | | |
|---|---|---|
| FR | 2 721 559 A | 6/1994 |
| FR | 2 972 169 A | 3/2011 |
| WO | 1995/21762 | 8/1995 |
| WO | 2011/032560 A1 | 3/2011 |

OTHER PUBLICATIONS

International Preliminary Report on Patentability dated Apr. 11, 2017, issued in PCT Application No. PCT/IB2015/054202, filed Jun. 3, 2015.

* cited by examiner

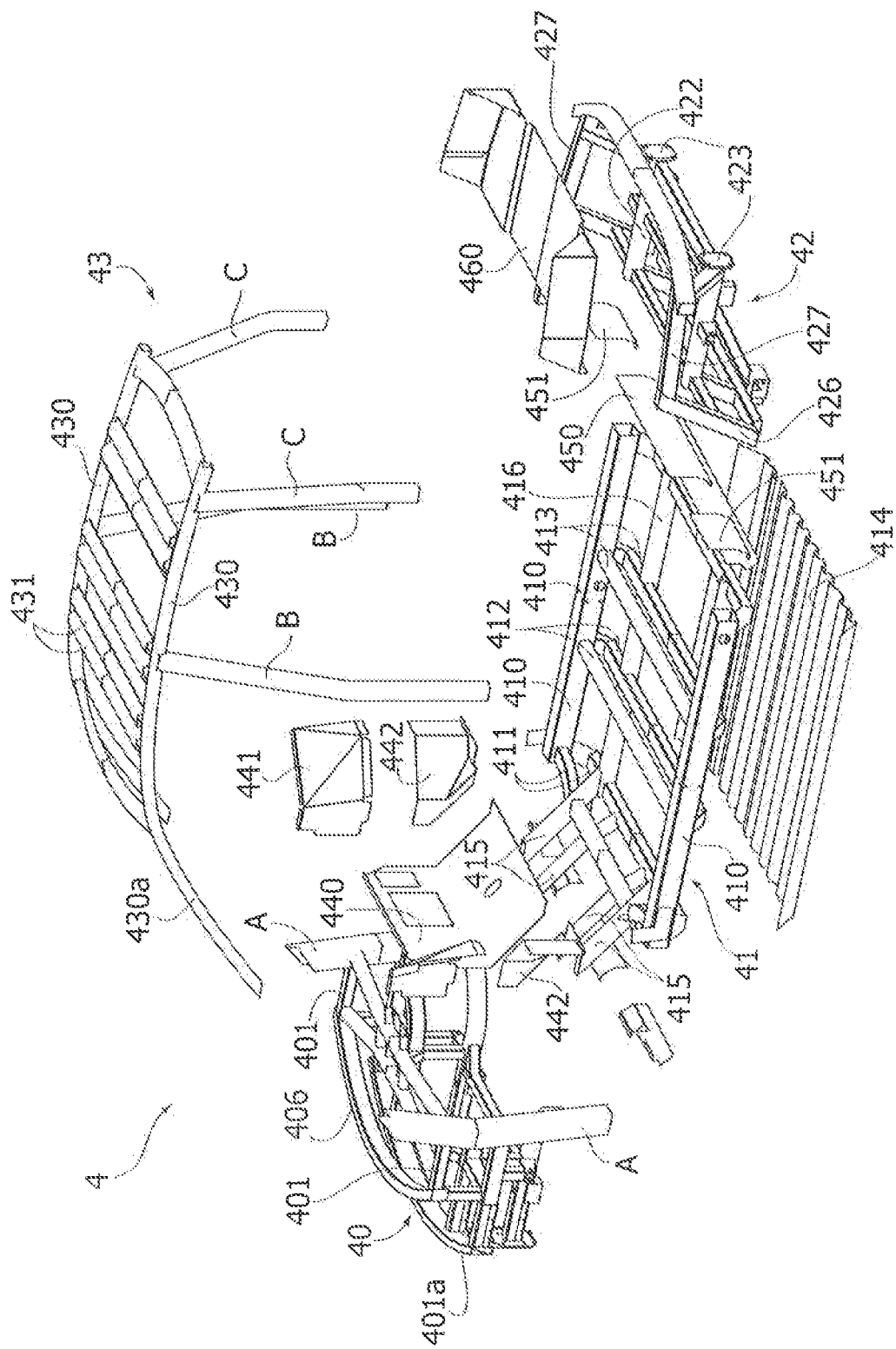

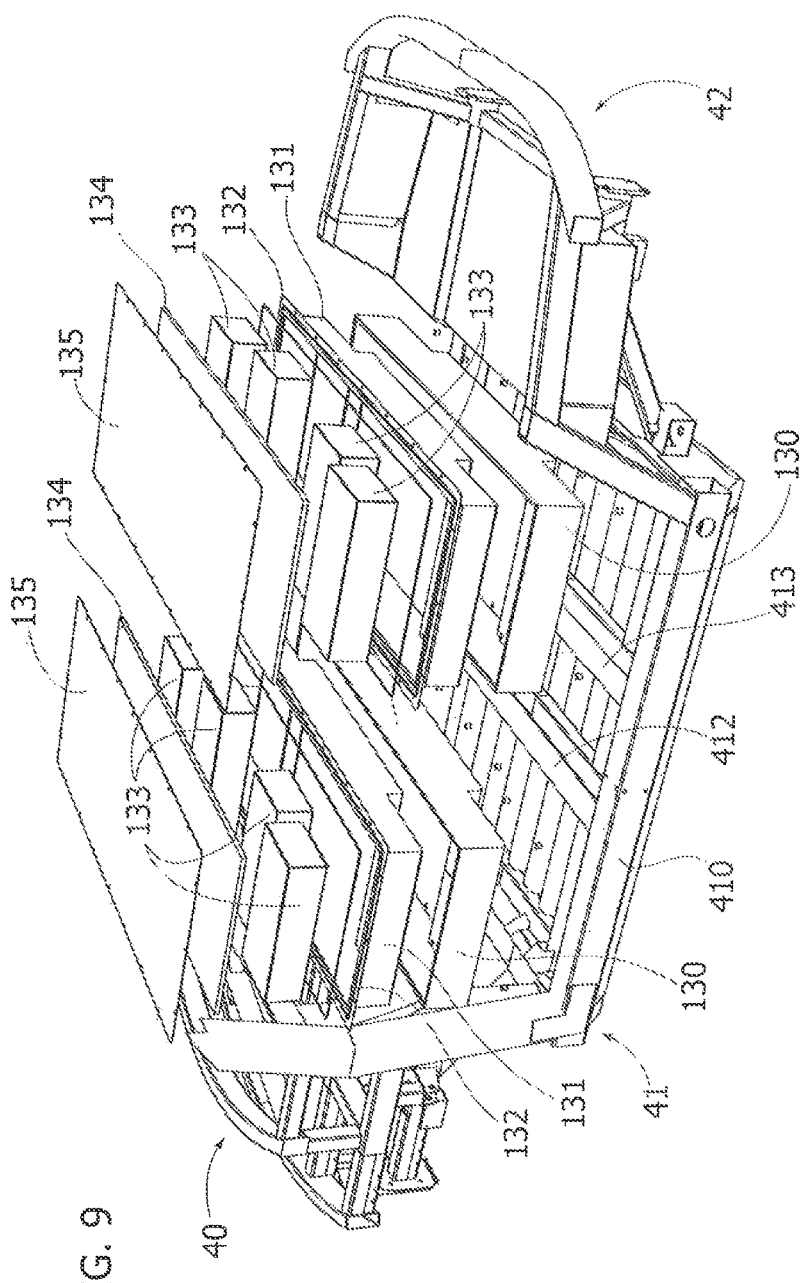
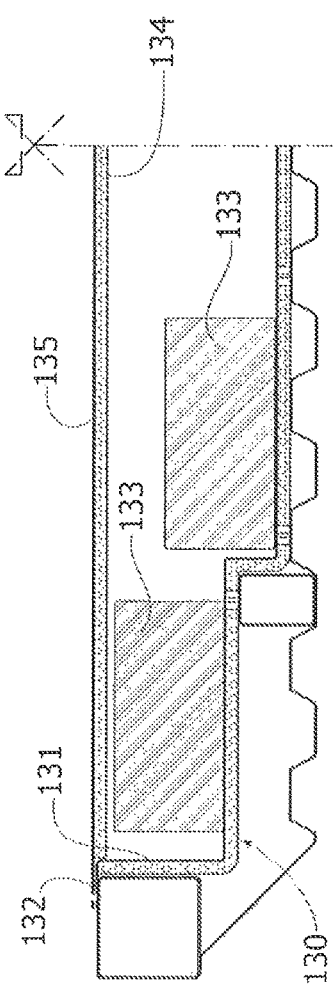
FIG. 9
FIG. 10

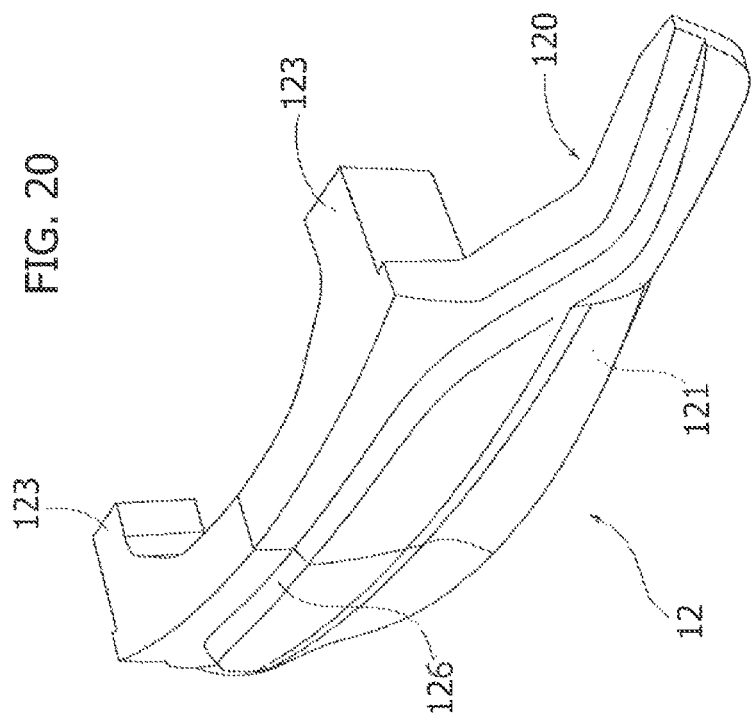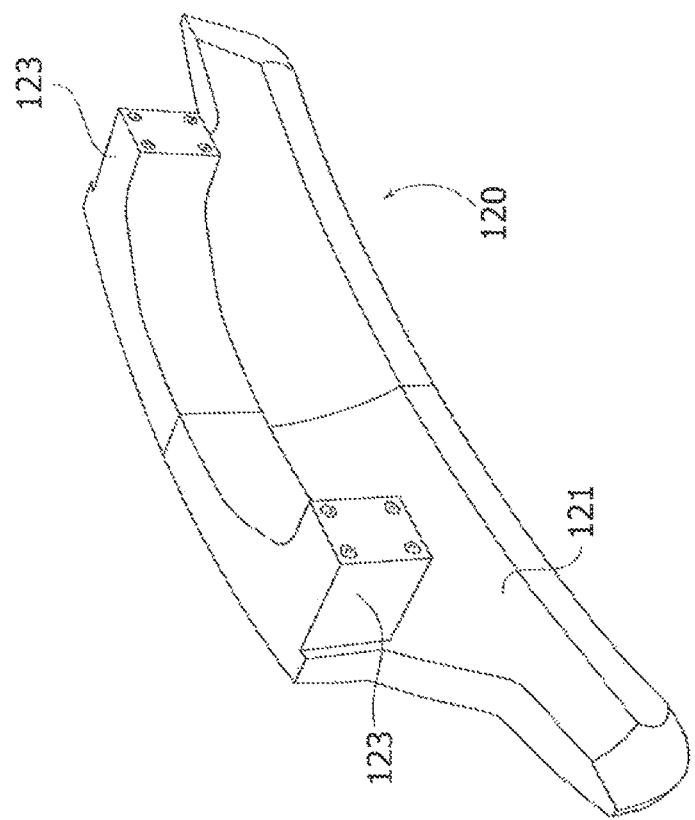

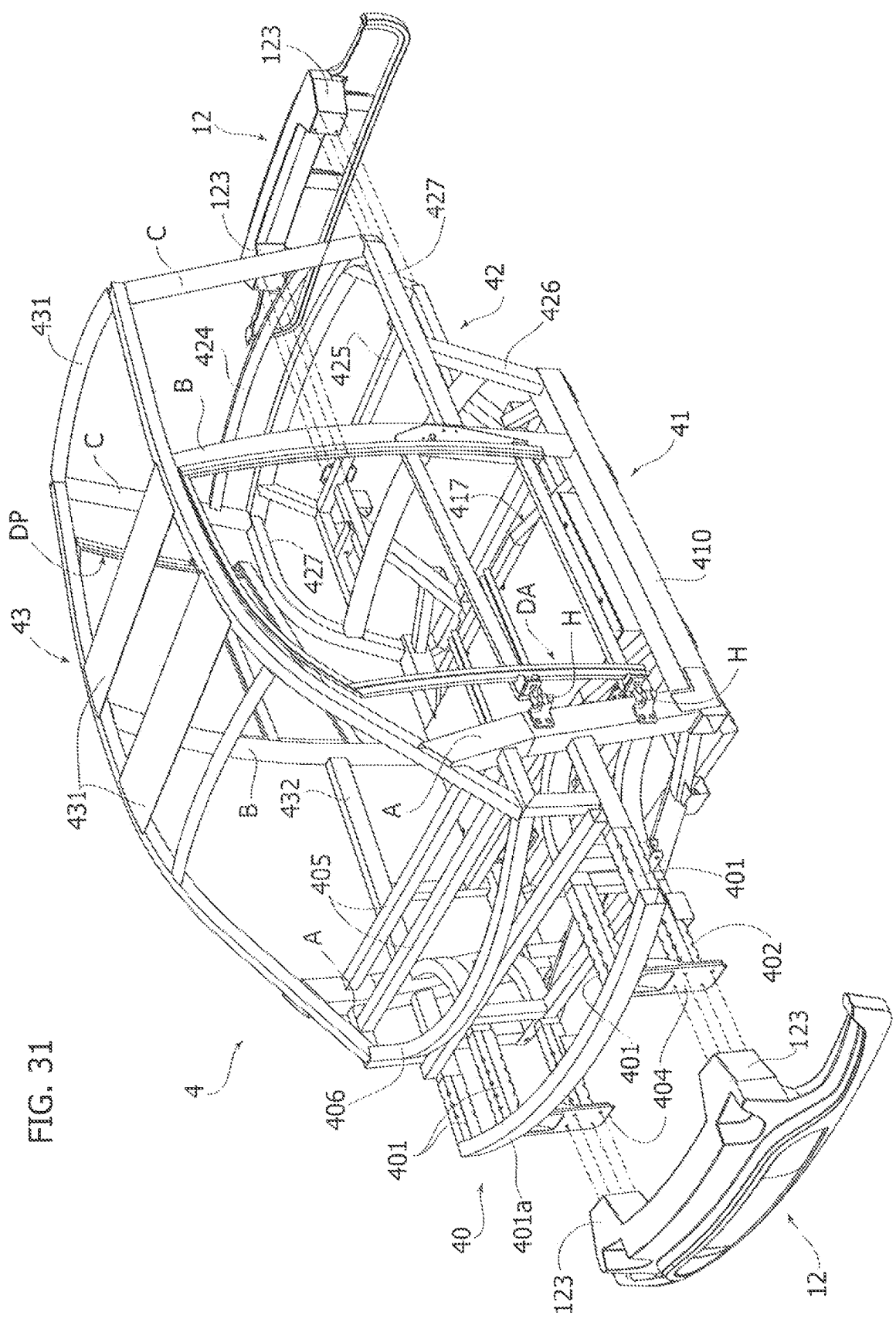

ELECTRIC MOTOR VEHICLE FOR TRANSPORT OF GOODS MADE OF A ROTOMOULDED BODY SUPPORTED BY A MODULAR TUBULAR FRAME

FIELD OF THE INVENTION

The present invention relates to the field of electrically powered motor vehicles, with particular reference to the category of minivans for transport of goods.

Even more in particular, the invention regards an electrically powered motor vehicle, of the type comprising:
a main frame;
a front axle assembly; and
a rear axle assembly,
wherein said axle assemblies each comprise an auxiliary supporting frame and two suspension units that connect two respective wheel supports to said auxiliary supporting frame, and
wherein at least one of said axle assemblies is a motor-driven axle with steering wheels, further comprising, mounted on said auxiliary supporting frame, an electric motor for driving the wheels in rotation, a control unit of said motor, a transmission unit for transmission of motion 20 from the electric motor to the wheels, and a steering device for enabling steering of the wheel supports.

OBJECT OF THE INVENTION

A first object of the present invention is to provide the motor vehicle with a container body for transport of goods that presents at the same time good characteristics of sturdiness and lightness and is configured for being integrated with simple operations in the structure of the motor vehicle.

A further object is to provide a motor vehicle, the structural architecture of which will enable drastic simplification of manufacturing processes and equipment, consequently reducing the installation costs, so as to render even a small-scale production economically advantageous.

A further important object of the present invention is to provide a motor vehicle with a structural architecture that will afford high flexibility of production in the sense of enabling production of various versions or models of motor vehicle through simple and economically advantageous adaptations of the production equipment.

A further object of the invention is to achieve all the aforesaid targets with a motor-vehicle structure that will guarantee characteristics of sturdiness and safety for the occupants in the event of impact that are considerably superior to the ones that can normally be obtained in motor vehicles of the same category.

A further object of the invention lies in the creation of a motor-vehicle structure that will guarantee an efficient housing space that is protected from impact for the electrical batteries for supplying the electric drive motor or motors provided on board the motor vehicle.

Finally, a further object of the invention is to provide a motor-vehicle structure that can be assembled with extremely simple operations and in extremely short production times.

SUMMARY OF THE INVENTION

With a view to achieving all the aforesaid objects, the subject of the present invention is a vehicle having all the characteristics of the annexed claim 1.

Further preferred and advantageous characteristics of the motor vehicle according to the invention are specified in the annexed dependent claims.

Thanks to the above characteristics, the present invention achieves a series of important advantages.

First of all, division of the structure of the main frame into subassemblies, and the specific configuration described in what follows of each of these subassemblies enables a drastic simplification in the operations of manufacture and assembly, together with an extremely high flexibility of production given that the aforesaid structure is suited for production of a large number of different versions and models of motor vehicle with simple and immediate adaptations of the structure and of the corresponding production equipment.

The use of lattice structures with arms constituted by box-section elements made of sheet steel, preferably high-strength steel, at the same time enables extremely good characteristics of sturdiness and sufficiently low production costs to be obtained, thus allowing even medium-scale and small-scale production. The specific structure described in what follows of the front and rear frame subassemblies and in particular the provision of front struts for absorption of impact energy on two levels set on top of one another and at a distance apart, distributed along the width of the structure, enables a very high capacity of absorption of impact energy to be obtained for motor vehicles of this category.

Use of rotational-moulding technology to produce the container body for the transport of goods proves extremely advantageous in so far as it enables elements to be obtained with the necessary qualities of sturdiness and at the same time good characteristics of lightness. Rotational-moulding technology is on the other hand perfectly compatible with the production of motor vehicles of this category, above all in the case of medium- or small-scale production. The transporting body has a structure that enables its production with extremely simple and low-cost operations. The same applies to the operations necessary for adapting the frame of the motor vehicle to receive the aforesaid transporting body, which once again demonstrates the extreme flexibility and economy of production that are afforded by the present invention.

BRIEF DESCRIPTION OF THE DRAWINGS

The present invention will now be described with reference to the annexed drawings, which are provided purely by way of non-limiting example and wherein:

FIG. 3 is an exploded perspective view of the frame of FIG. 2;

FIG. 9 illustrates a first solution for housing the electrical supply batteries, in exploded view;

FIG. 10 is a partial cross-sectional view, in a transverse plane, of the assembly of FIG. 9;

FIGS. 20 and 21 are a front perspective view and a rear perspective view of a bumper that can be used both as front bumper and as rear bumper of the motor vehicle according to the invention;

FIGS. 24-31 refer to a variant of the first embodiment of the invention, wherein:

FIG. 24 is a variant of FIG. 2,

FIG. 25 is a variant of FIG. 3,

FIG. 26 shows the structure of FIG. 24, completed with some elements made of sheet metal, FIG. 27 is a variant of FIG. 2A, FIGS. 28 and 29 illustrate the corresponding variants of FIGS. 6 and 7, FIGS. 30 and 31 illustrate the corresponding variant of FIG. 5, in the assembled condition and in exploded view, respectively.

DETAILED DESCRIPTION OF THE PREFERRED EMBODIMENTS

Figure 1:
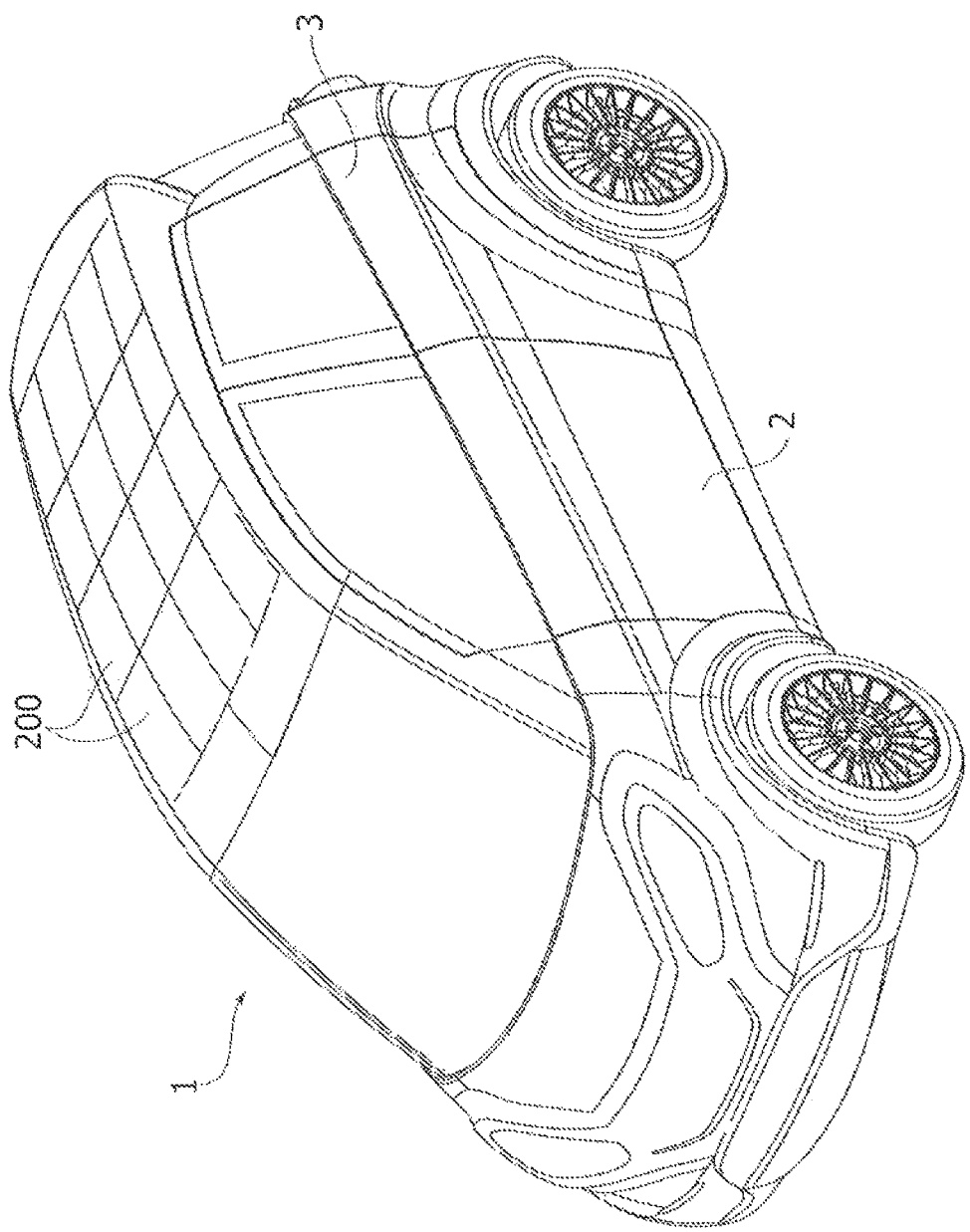
FIG. 1 is a perspective view of a first model of an electric car that does not form part of the present invention, but the description of which is useful for the purposes of an understanding of the present invention.

Designated by 1 in FIG. 1 is an electric car of the city-car category that has in common a series of features with the motor vehicle forming the subject of the present invention. Its description is hence useful for the purposes of a better understanding of the invention.

In the specific example illustrated, the car 1 is a car with a single central driving seat and two rear seats, which can be obtained according to different versions or configurations. In one version, there are provided only one front door 2 and one rear door 3 on one and the same side of the vehicle (which may indifferently be the left side or the right side for countries with right-hand driving and left-hand driving). In this version of the car, the structure of the motor vehicle is without the upright B on the side of the doors. The front door 2 is hinged at the front, and the rear door 3 is hinged at the rear, so that the two doors 2, 3 open like a book leaving access to the driving seat and to the two rear seats completely free. Otherwise, the car may be provided with just two conventional front doors on the two sides of the car, in which case the uprights B are provided on both sides of the framework. Provided on the roof panel are photovoltaic cells 200 in themselves of a known type, englobed in a sheet made of flexible plastic material glued to the roof panel.

Figure 2:
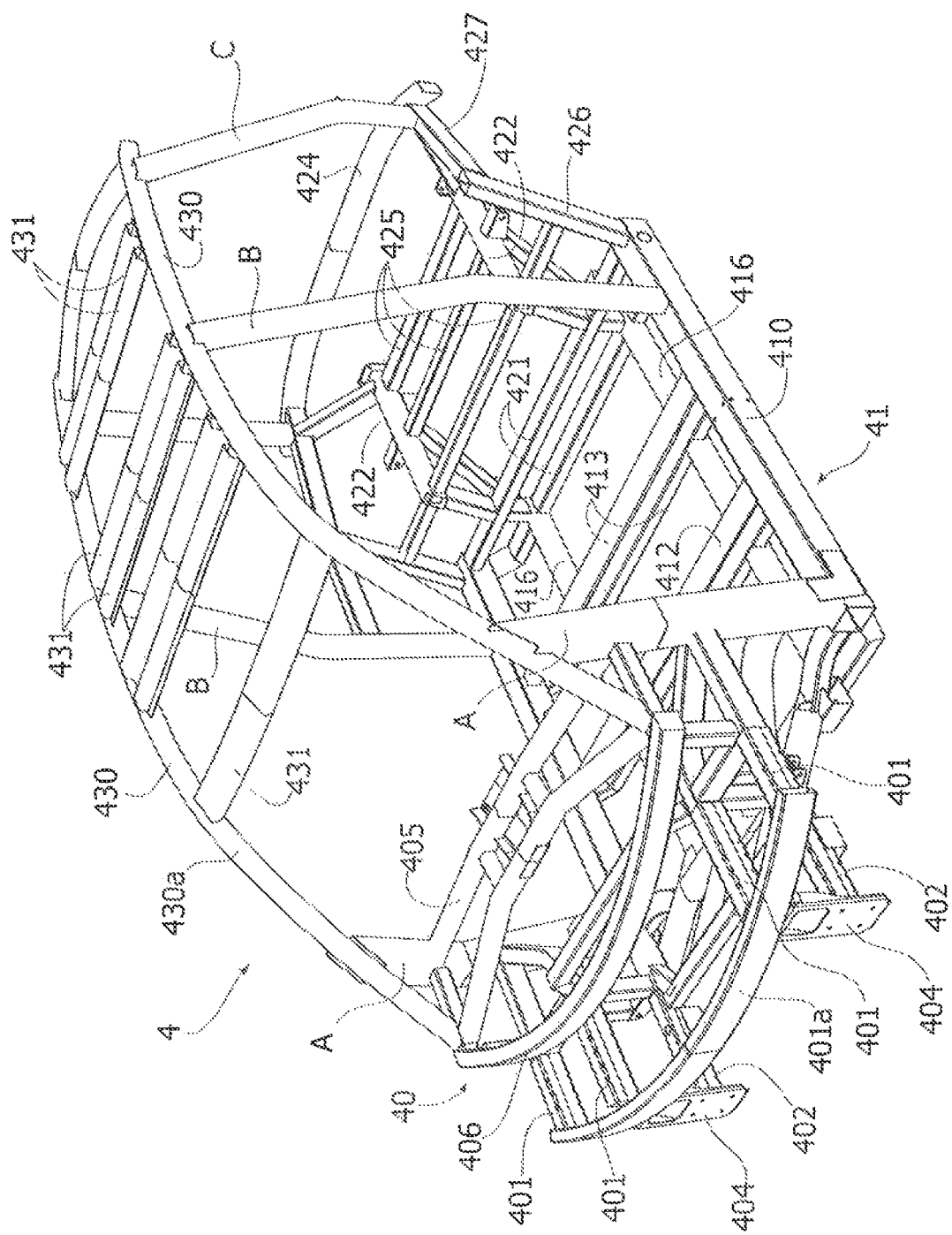
FIG. 2 is a perspective view of the main frame of the car of FIG. 1.

FIG. 2 shows an example of embodiment of the frame of the motor vehicle of FIG. 1, in the version with uprights B on both sides (whilst FIGS. 4-8 show the version without one of the two uprights B). The frame illustrated in FIG. 2, and designated as a whole by the reference number 4, constitutes the main frame of the motor vehicle, designed to receive two auxiliary frames 5 (see FIG. 2A) for supporting front and rear axle assemblies 6, 7.

Figure 2A:
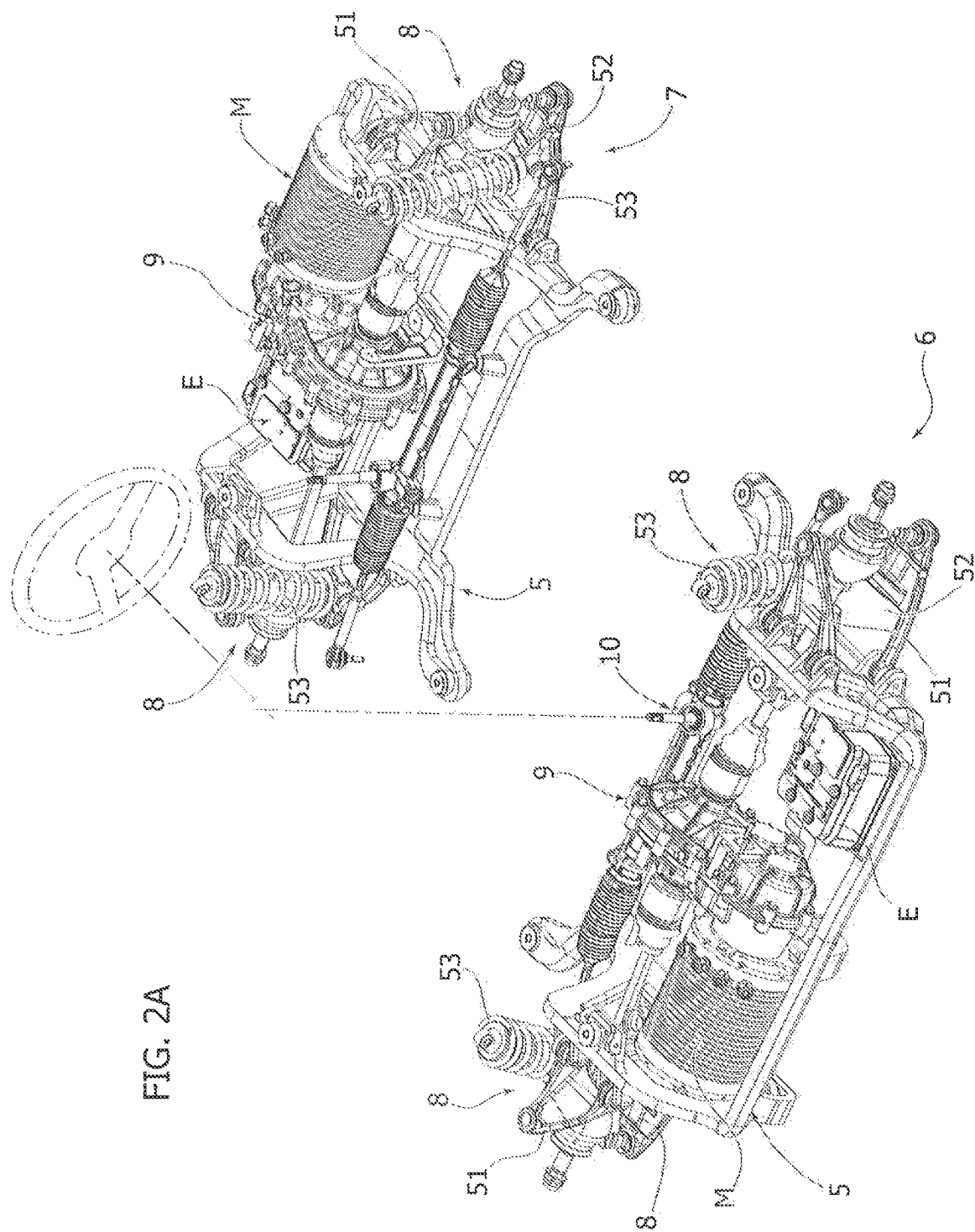
FIG. 2A is a perspective view of the two front and rear axle assemblies that form part of the car of FIG. 1 and are provided with respective auxiliary supporting frames designed to be assembled on the frame of FIG. 2.

The example illustrated in FIG. 2A regards the solution that has already formed the subject of the prior Italian patent application No. TO2014A000305, filed in the name of the present applicant, where each axle assembly comprises two suspension units 8 that connect the respective wheel supports to the auxiliary supporting frame 5, an electric motor M for driving the wheels in rotation, a control unit E for the electric motor M, and a transmission assembly 9 with differential for transmission of motion from the electric motor to the wheels. Furthermore, once again in the case of the specific example illustrated, both of the front and rear axle assemblies have steering wheels and consequently include a steering device 10 for control of steering of the wheels. It is, however, to be emphasized that the invention discussed herein applies also to a motor vehicle in which the electric motor M, the corresponding control unit E, the transmission unit 9, and the steering device 10 are associated only to one of the two axle assemblies, the other axle assembly carrying only the two respective suspension units 8.

In the aforesaid embodiment, each wheel is rotatably mounted on a wheel support (not visible in the drawings), which is mounted oscillating on the respective supporting frame 5 by means of a top transverse arm 51 and a bottom transverse arm 52. Each transverse arm has a triangular configuration, with one end connected in an articulated way to the frame 5 by elastic supporting means and the opposite end connected in an articulated way to the wheel support. Also associated to each wheel is a cylinder/helical-spring shock-absorber assembly, designated as a whole by the reference 53. Each cylinder/spring shock-absorber assembly is connected to the bottom arm 52, on each side of each axle assembly. In the case of the rear axle assembly, this enables the top end of each cylinder/spring shock-absorber assembly 53 to be located at a relatively low level, which enables an increase in the space available in the passenger compartment of the motor vehicle, in a vertical direction.

A further advantageous characteristic of the embodiment that is illustrated herein lies in the fact that the top arms 51 of the rear axle assembly have a configuration such that the end of each arm connected to the respective frame 5 is shifted longitudinally with respect to the outer end of the arm 51 that is connected to the respective wheel support. This result is achieved with an arm 51 having a markedly curved configuration in plan view. In the case of the rear axle assembly, the outer end of each arm 51 is shifted longitudinally forwards, whereas in the case of the front axle assembly the outer end of each arm 51 is shifted longitudinally backwards. Thanks to this configuration, the cylinder/spring shock-absorber assembly 53 associated to each rear transverse arm 51 can be positioned in such a way as to leave free the space within the passenger compartment in the area of the two rear lateral seats of the motor vehicle. Consequently, thanks to this configuration of the rear axle assembly, the rear lateral seats of the motor vehicle according to the invention can be positioned at a considerable distance from one another, in the transverse direction, as compared to the external transverse dimension of the car, which increases considerably the space available for the passengers, in the transverse direction.

In the embodiment illustrated, the two front and rear axle assemblies are identical to one another (except for the fact that one is rotated through 180° with respect to the orientation of the other) so as to simplify and render more economically advantageous production of the car.

Figure 3A:
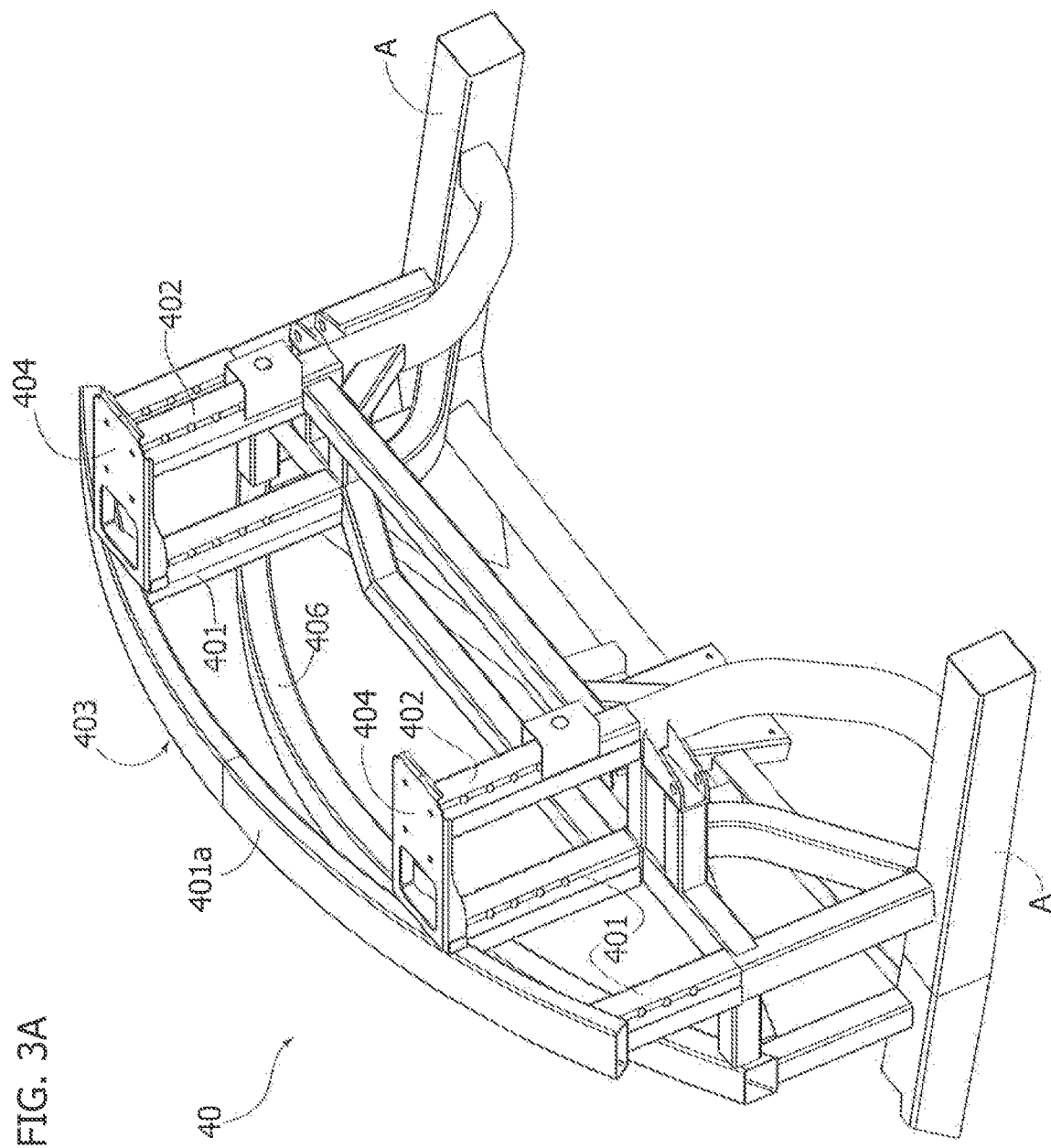
FIG. 3A is a perspective view from beneath of the front frame subassembly forming part of the frame of FIGS. 2 and 3.

With reference now to FIGS. 2, 3, and 3A the frame 4 is constituted by frame subassemblies that are preliminarily assembled each individually so that they can then be connected together in a fast way. With reference in particular to FIG. 3, the main frame 4 hence comprises a front frame subassembly 40, a floor-panel subassembly 41, a rear subassembly 42, and a top subassembly 43.

According to an important characteristic common to the motor vehicle of the present invention, each of the above sub-assemblies has a lattice structure including arms constituted by box-section elements made of steel, preferably high-strength steel. Studies and experiments conducted by the applicant have in fact shown that use of the above material enables advantages to be achieved comparable even to those of aluminium in terms of lightness, at the same time guaranteeing a high level of sturdiness and simplifying considerably the operations of manufacture, with consequent significant reduction in costs.

With reference now in particular to FIGS. 2 and 3A, the frame subassembly 40 comprises two lateral uprights A connected by a lattice structure projecting at the front from which are four longitudinal struts 401 for absorbing impact energy, set at a first, top, level and distributed in the transverse direction over the width of the frame, and two longitudinal struts 402, which are also designed for absorbing the impact energy and are set at a second, bottom, level, symmetrically at the two sides of the longitudinal median plane of the motor vehicle. All the longitudinal struts 401, 402 constitute as many crash boxes, which are designed to collapse following upon a front impact, for absorbing the impact energy. The two struts 401 located more adjacent to the median plane of the motor vehicle are vertically aligned with the struts 402. The front ends of the top struts 401 are connected to a cross member 401a, designed to distribute the force of impact over the struts. The two bottom struts 402 have their front ends connected to plates 404 designed to be connected to a cross member altogether similar to the cross member 403 or else to a cross member integrated in a bumper of the motor vehicle, according to what will be described in greater detail in what follows. In its top part, the lattice that connects the uprights A further comprises a cross member 405 which has the purpose of supporting the steering column, and a further cross member 406 constituting the bottom supporting edge for the windscreen of the motor vehicle.

As is evident, the structure of the front subassembly 40 of the frame of the motor vehicle according to the invention at the same time presents good characteristics of lightness and sturdiness and a great capacity of absorption of impact energy that leads the motor vehicle according to the invention to represent a step forwards as compared to motor vehicles of the same category built so far.

The floor-panel subassembly 41 comprises two main longitudinal or side members 410 connected together by a pair of front cross members 411, set vertically at a distance apart, and by two pairs of intermediate cross members 412, 413, which are also set vertically at a distance apart. The connection between the rear ends of the two longitudinal members 410 is instead completed with assembly of the rear frame subassembly 42. The frame subassembly 41 is completed with a sheet-metal floor panel 414, set underneath the lattice constituted by the longitudinal members 410 and by the cross members 411, 412, 413. The metal sheet 414 is a corrugated metal sheet with longitudinal ribbings oriented in the longitudinal direction of the motor vehicle. The structure of the longitudinal members 410 and of the cross members 411, 412, 413 is obtained with the technique of steel box-section elements. Projecting from the pair of front cross members 411 are inclined longitudinal arms 415, the front ends of which are connected to the lattice constituting the front frame subassembly 40.

The structure described above of the floor-panel subassembly 41 is conceived for achieving the necessary characteristics of sturdiness and at the same time providing three containment spaces (one space between the pairs of intermediate cross members 412, 413, and two spaces at the front and at the back of these cross members) designed for housing the electrical batteries for supplying the motor vehicle, as will be described in greater detail in what follows. Two further longitudinal members 416 extend longitudinally within the two main longitudinal members 410, for connecting together the bottom cross members of the pairs 411, 412, 413 and the front cross members forming part of the rear frame subassembly 42.

With reference now to FIGS. 2 and 3, also the rear frame subassembly 42 comprises a lattice structure constituted by box-section arms made of steel. This structure includes a pair of front cross members 421 set vertically at a distance apart from one another, which connect together the rear ends of the longitudinal members 410 and 416. The lattice includes two longitudinal struts 422, which terminate with plates 423 designed to be connected by a cross member (in the way that will be described in detail in what follows) for absorbing rear impact. The lattice of the rear subassembly 42 further includes lateral arms 423, the rear ends of which are connected together by a cross member 424 and are moreover designed to be connected to the bottom ends of the uprights C, which form part of the top frame subassembly 43. The lateral arms 423 extend vertically higher up than the longitudinal struts 422 and than three cross members 425 that connect together the struts 422 in such a way that these cross members 422 define a resting surface for the rear seat of the motor vehicle.

With reference once again to FIGS. 2 and 3, the top subassembly 43 has two longitudinal members 430 that with their front portions 430a define the side edges of the supporting frame for the windscreen. The main portions of the longitudinal members 430 define, instead, the longitudinal supporting elements of the roof panel, connected together by cross members 431. Pre-assembled on the longitudinal members 430 are the top ends of the uprights B and C in such a way that the operations for assembly of the frame 4 proceed after the four subassemblies 40, 41, 42, 43 have been preliminarily assembled according to the configurations illustrated in FIG. 3. The aforesaid subassemblies are then completed with front elements made of sheet metal 440, 441, 442 so as to constitute the firewall that separates the passenger compartment of the car from the front axle assembly, sheet-metal plates 450, 451 that separate the passenger compartment of the car from the rear axle assembly, and a sheet-metal plate 460 that rests on the cross members 425 of the rear frame subassembly so as to constitute the resting surface of the rear seat.

Figure 4:
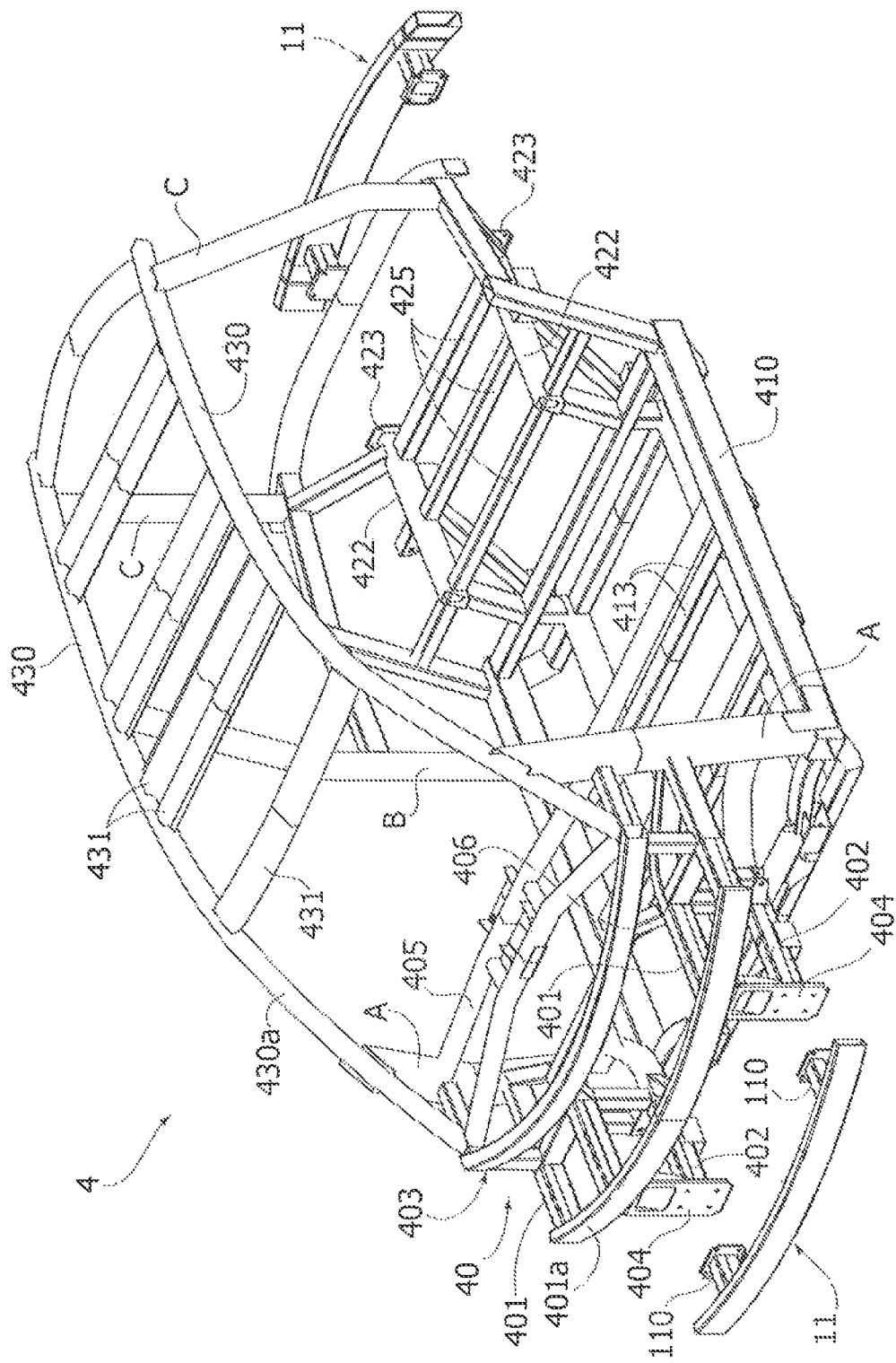
FIGS. 4 and 5 are further perspective views of the frame of FIG. 2 completed with two different versions of the front cross member and of the rear cross member.

FIG. 4 shows the example of solution where one and the same type of cross member 11 is used for connecting together the plates 404 at the front ends of the struts 402 and the plates 423 at the rear ends of the struts 422. The cross member 11 is provided at the rear with two crash boxes 110 with flanges for attachment to the plates 404 and 423.

Figure 5:
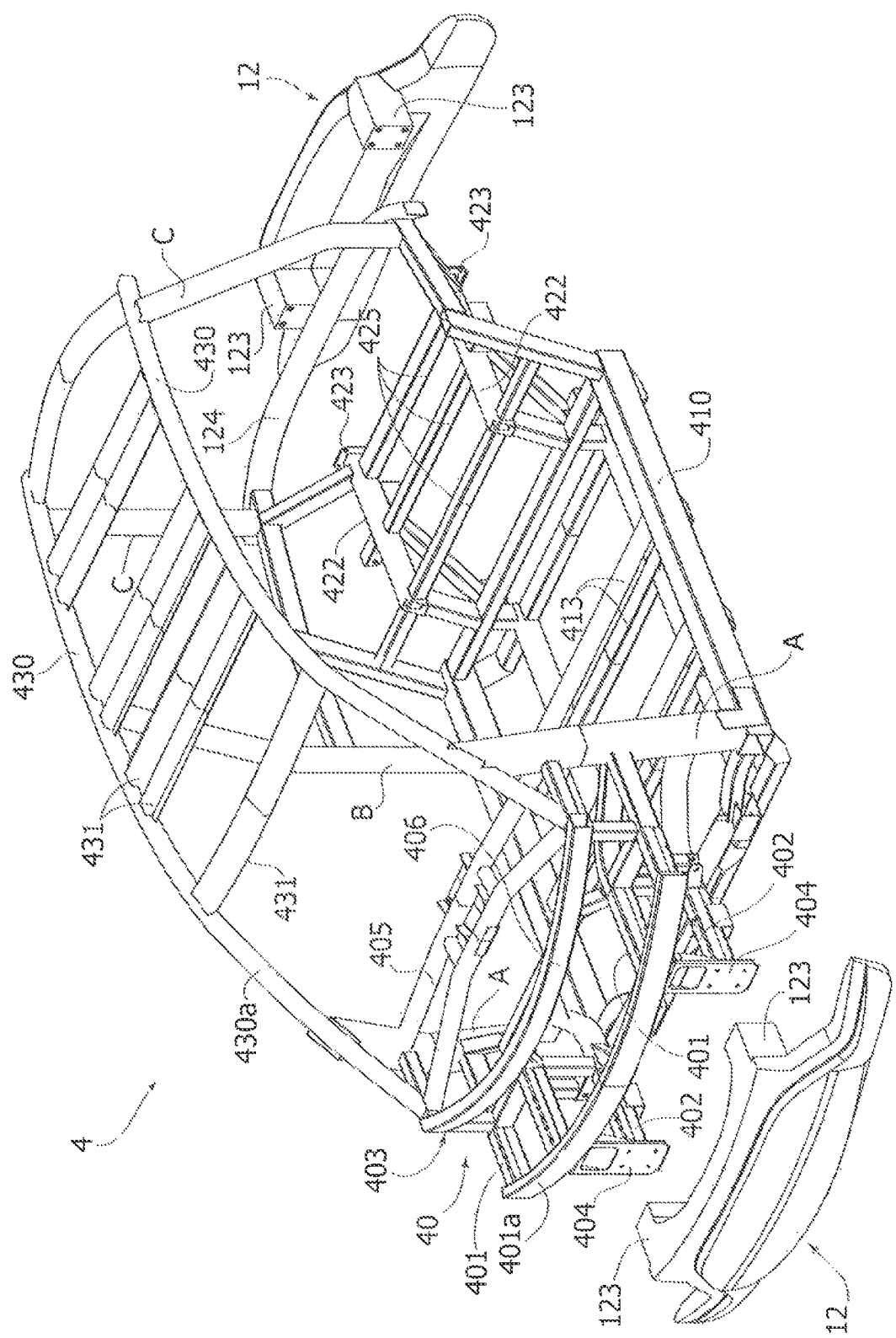

FIG. 5 shows the example of solution where the cross member for connecting the plates 404 and 423 is englobed in a bumper made of plastic material 12.

FIGS. 20-23 of the annexed drawings refer to a preferred example of embodiment of the bumper 12 that envisages use of the technique of rotational moulding for producing the bumper. In this way, it is possible to obtain a hollow structure having a wall made of rigid plastic material, for example polyethylene, with the internal cavity that is subsequently filled with foamed plastic material, for example polyurethane, for bestowing the necessary characteristics of sturdiness. With reference to the example of FIGS. 20-23, the bumper 12 has a hollow polyethylene body 120, having walls 121 and an internal cavity 122 (filled with polyurethane). The body 120 is shaped with two rear projections 123, embedded in which are steel plates 124 with threaded bushings 125 for enabling screwing onto the brackets 404, 423. These rear projections 123 have the dual purpose of enabling convenient engagement of the bumper to the main frame and absorbing all the energy of an impact at a speed lower than 16 km/h in such a way that the deformation will not be transferred to the rest of the frame, thus limiting damage due to impact (so-called "assurance test").

Figure 23:
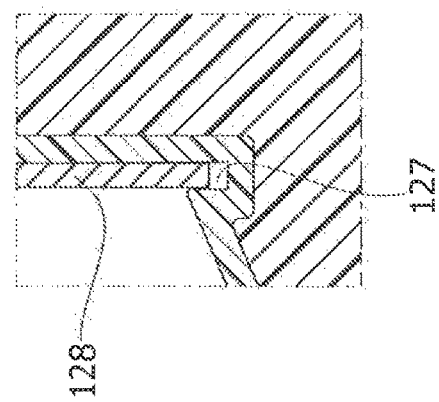
FIG. 23 illustrates at an enlarged scale the detail XXIII of FIG. 22.
Figure 22:
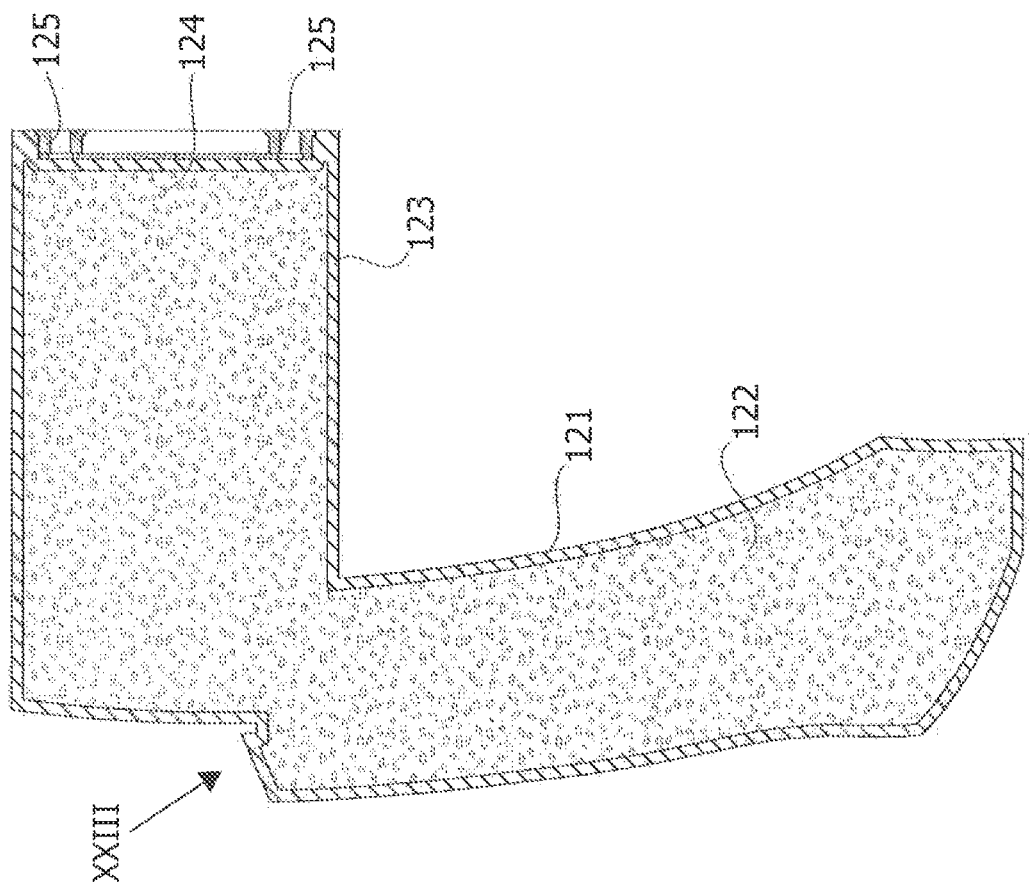
FIG. 22 is a cross-sectional view at an enlarged scale of the bumper of FIGS. 20 and 21.

Once again with reference to the example of embodiment of FIGS. 20-23, the front surface of the bumper 12 has a shaped step 126 where a groove 127 is formed in which a bottom edge of a front panel of bodywork 128 engages (see FIG. 23). The groove 127 has a depth such as to ensure a certain play for the bottom edge of the panel 128 inside it, which enables relative movements between the panel of the body and the bumper 12.

Figure 6:
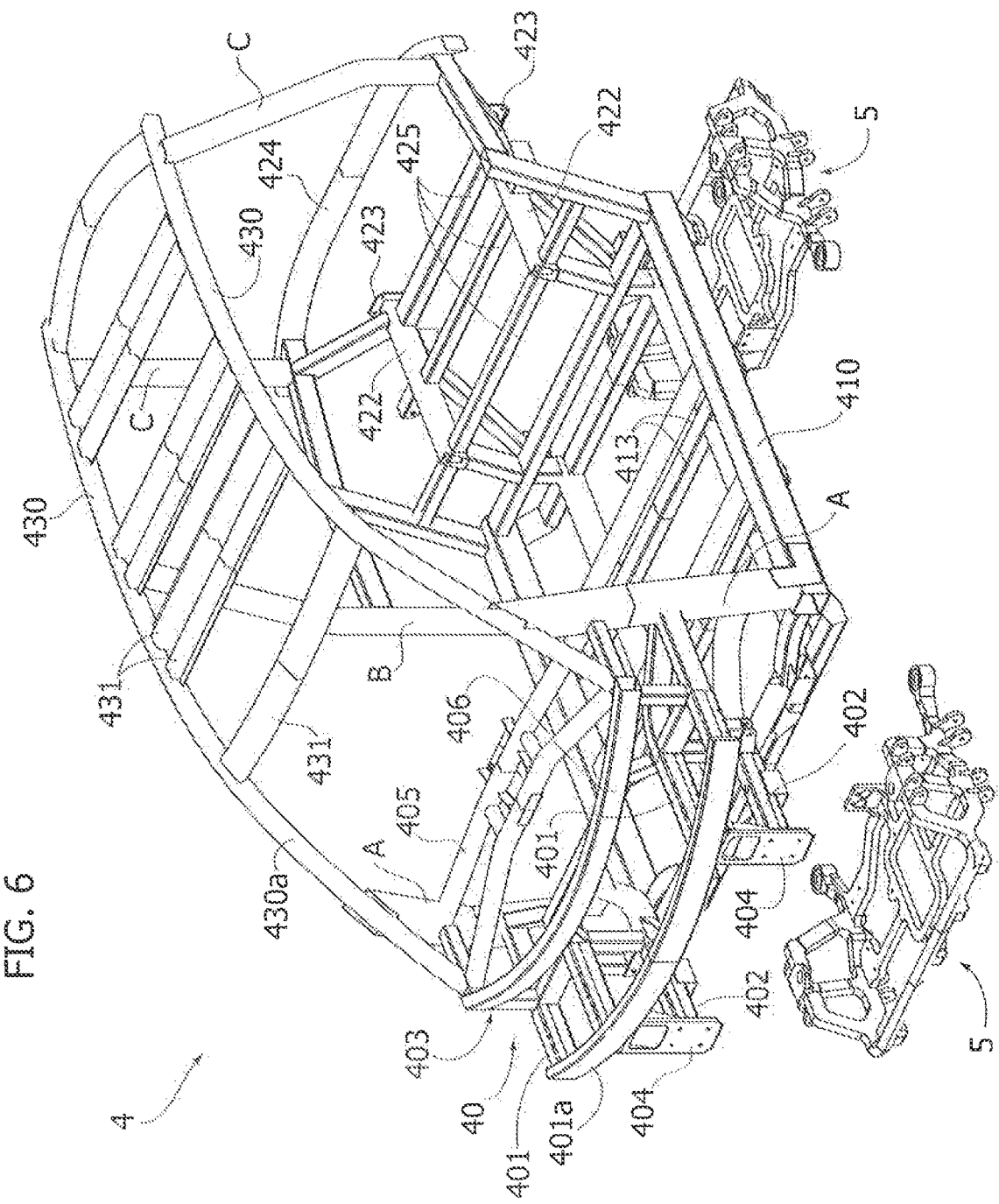
FIG. 6 is an exploded perspective view, which shows the frame of FIG. 2 together with the auxiliary supporting frames for the axle assemblies, for a first version of the front and rear suspensions of the motor vehicle.
Figure 7:
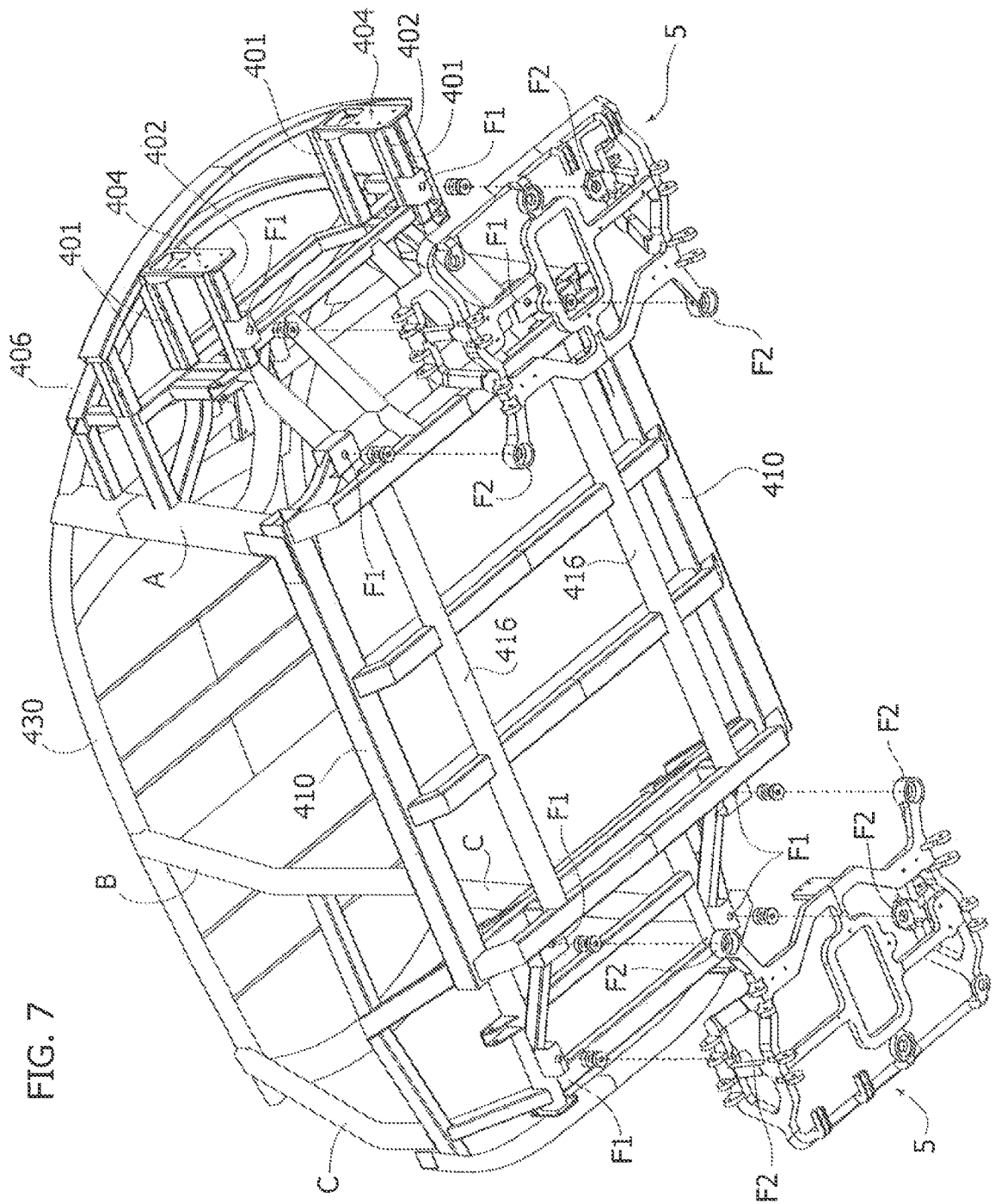
FIG. 7 is a view from beneath of the same elements as those illustrated in FIG. 6, which shows the points of connection of the auxiliary frames to the main frame.

With reference now to FIGS. 6 and 7, illustrated therein are the main frame of the motor vehicle 4 already described above, together with the two auxiliary supporting frames 5 in the version of the frames 5 prearranged for suspensions of the articulated-quadrilateral type.

As may be seen in FIG. 7, each of the frames 5 is assembled on the main frame 4 by being bolted only at four fixing points (F1 on the frame 4 and F2 on the auxiliary frame 5).

Figure 8:
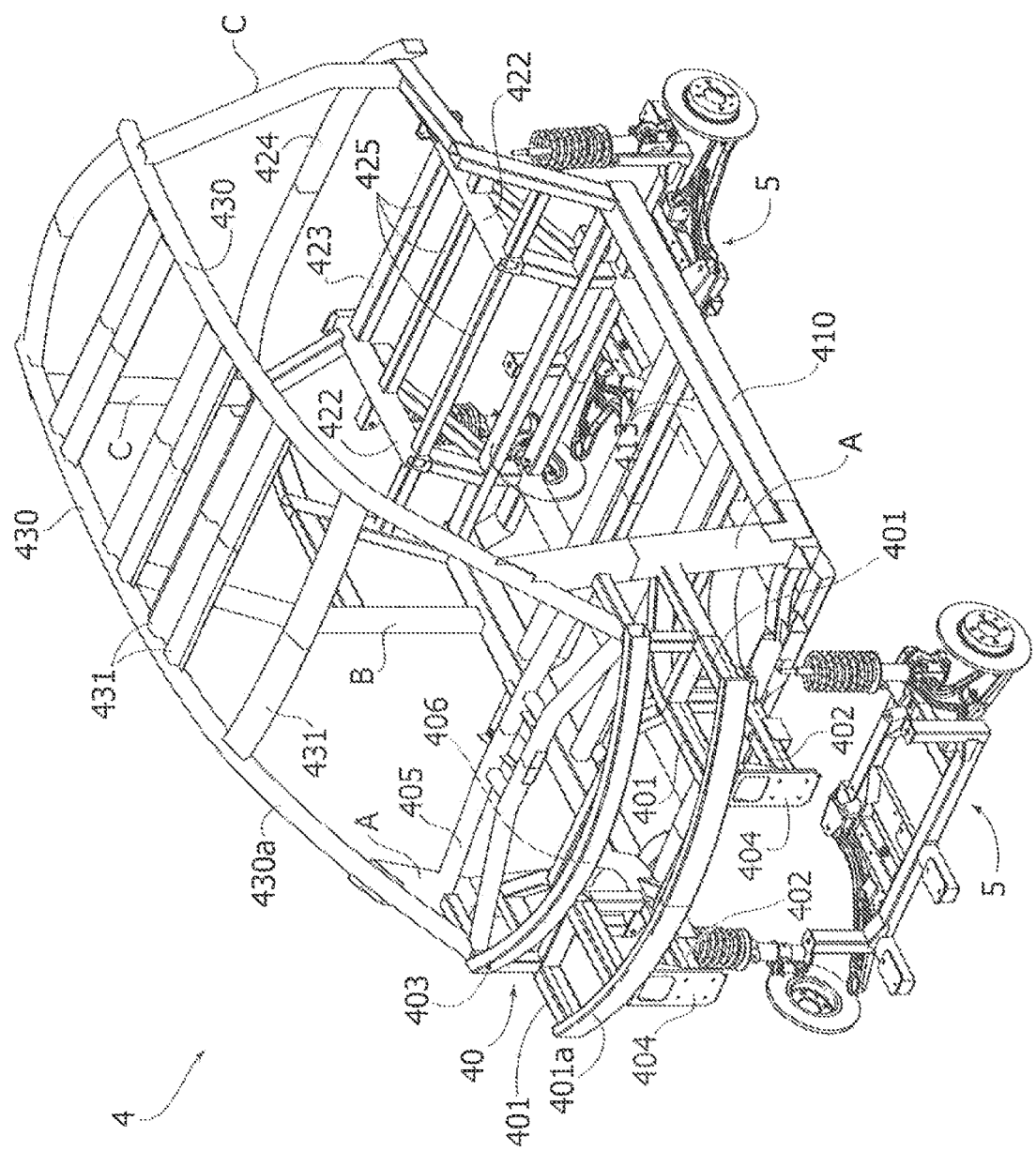
FIG. 8 illustrates a variant of FIG. 6, corresponding to a different type of front and rear suspensions.

FIG. 8 shows a variant in which the auxiliary frames 5 are prearranged for carrying suspensions of the McPherson type, the entire suspension unit being pre-assemblable on the frame 5 and mountable therewith in a subsequent step on the frame 4. FIG. 8 also regards an example in which the left upright B is eliminated to enable provision on the left side of the car of two doors that open in booklike fashion and enable facilitated access to the front and rear seats.

Figure 11:
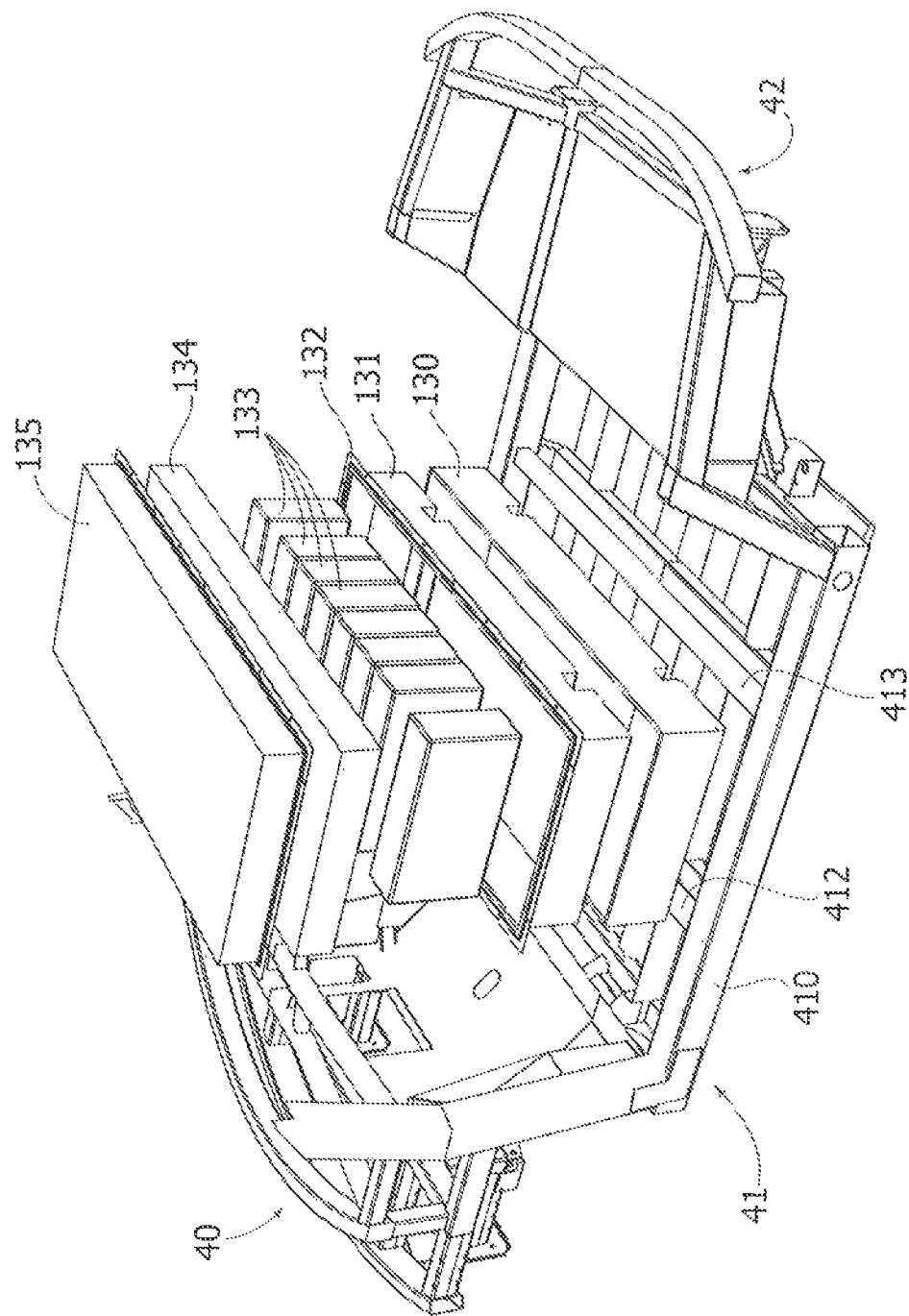
FIG. 11 is a further exploded perspective view that shows a different solution for housing the electrical supply batteries.

FIGS. 9 and 11 show two alternative solutions for prearrangement of the electrical batteries for supplying the motor or motors located on board the motor vehicle. These figures show the advantage of the structure already described above, which is prearranged for the floor-panel subassembly 41. In the solution of FIG. 9, two containers of battery modules are provided in the areas set at the front and at the back, respectively, of the two pairs of intermediate cross members 412, 413. FIG. 11 shows a solution in which a single container is provided in the area comprised between these cross members.

In FIG. 9, each of the two battery-module holder units comprises a bottom container 130 made of electrically insulating material (see also the cross-sectional view of FIG. 10) set within which is a bottom steel container 131 provided on its edge with a seal gasket 132. Set within the container 131 are a series of battery modules 133, located above which is a plate made of insulating material 134 that is then covered by a lid 135, the edge of which co-operates with the seal gasket 132. The same structure described above is adopted also in the case of the solution of FIG. 11, which envisages a single container in the central space comprised between the cross members 412, 413.

FIGS. 12-19 show a preferred embodiment of a motor vehicle of the minivan category according to the invention.

In this case, the motor vehicle has two front doors 2, or even just one front door, and is equipped at the rear with a container body 14 for transport of goods.

Figure 12:
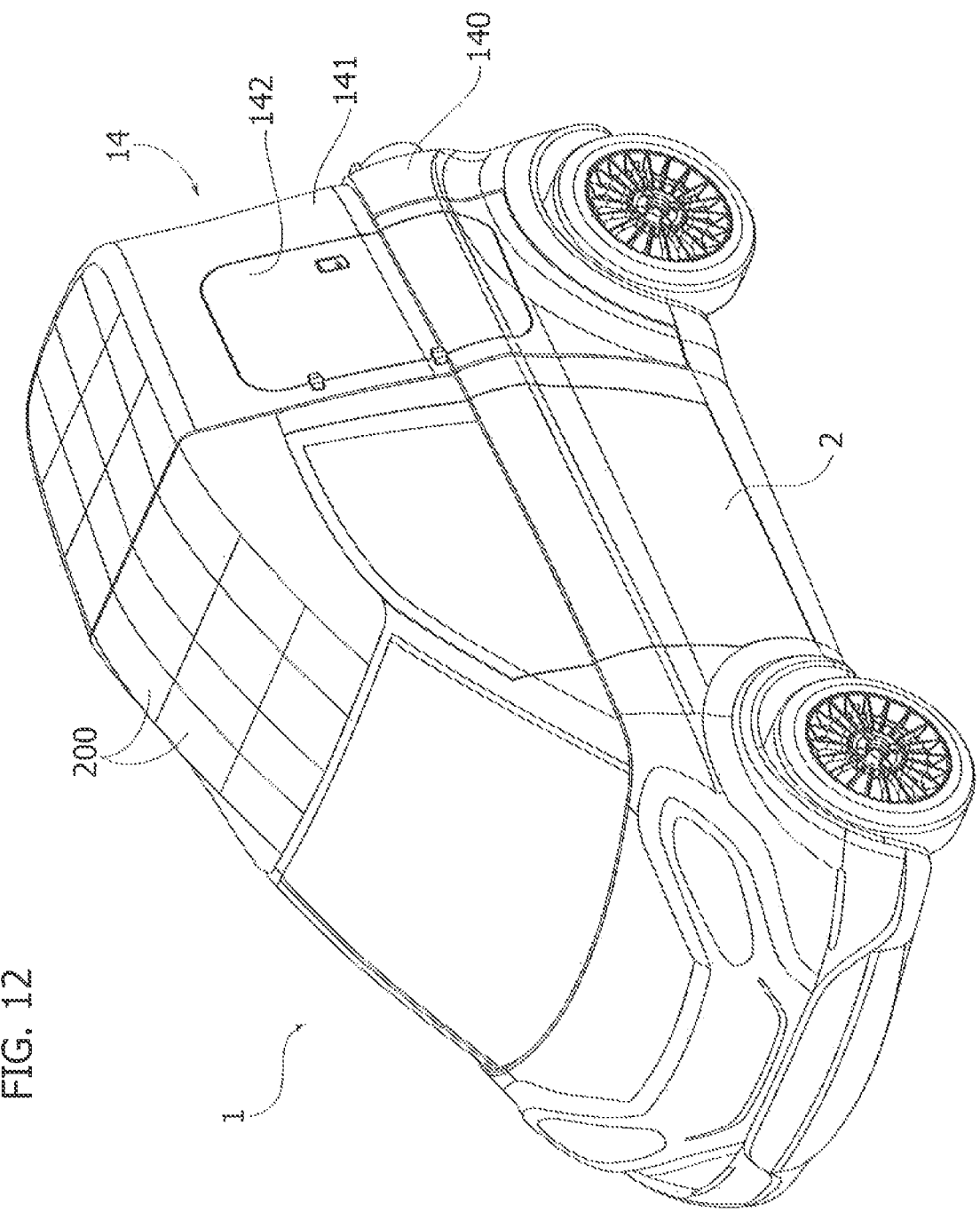
FIG. 12 is a perspective view of a model of motor vehicle according to the invention, of the minivan type, for transport of goods.
Figure 13:
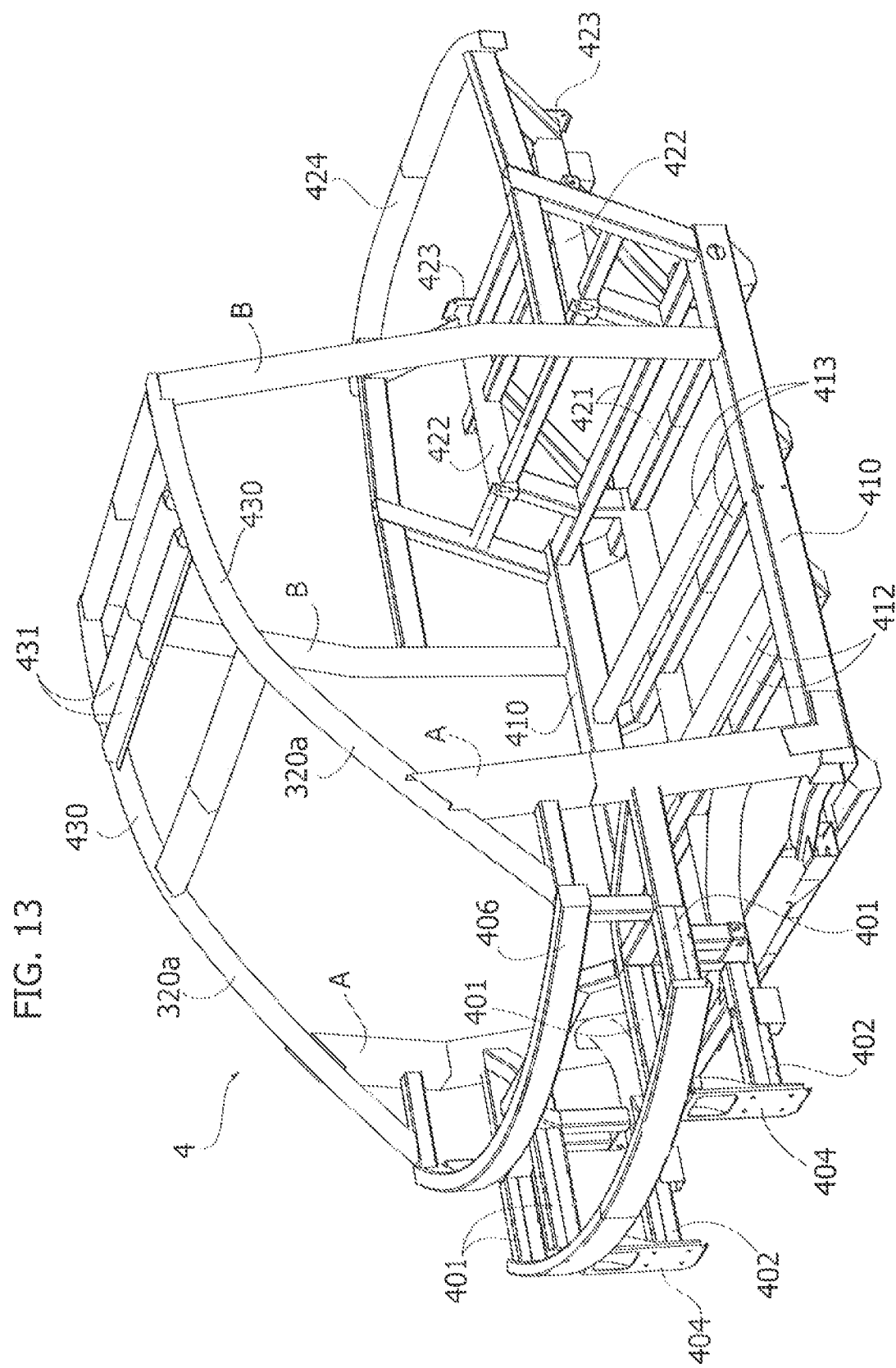
FIG. 13 is a perspective view of the main frame of the motor vehicle of FIG. 12.

FIG. 13 shows the frame 4 of the motor vehicle of FIG. 12. As may be seen, the frame is substantially identical to the version illustrated in FIGS. 2 and 3, except for the fact that the top frame subassembly 43 is without all the part that extends behind the uprights B.

Figure 14:
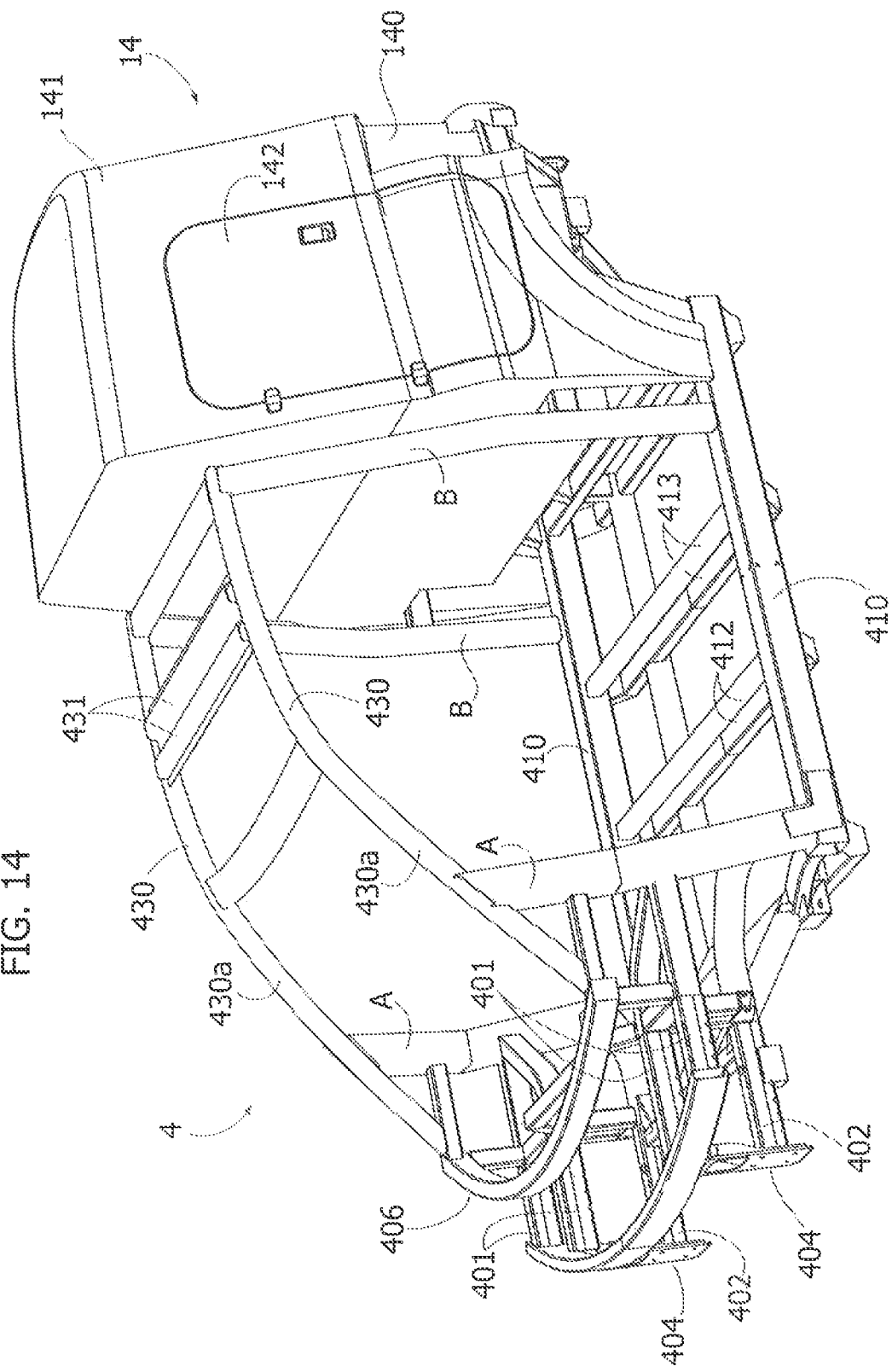
FIG. 14 shows the frame of FIG. 13 completed with the container body prearranged for transport of goods.

FIG. 14 shows the transporting body 14 assembled on the frame 4. In this case, the assembly operations are identical to those already described above with reference to the motor vehicle of FIG. 1, except for the fact that, after the frame subassemblies 40, 41, 42, 43 have been assembled to form the frame 4, the transporting body 14 is installed by being bolted on the frame 4 itself.

Figure 15:
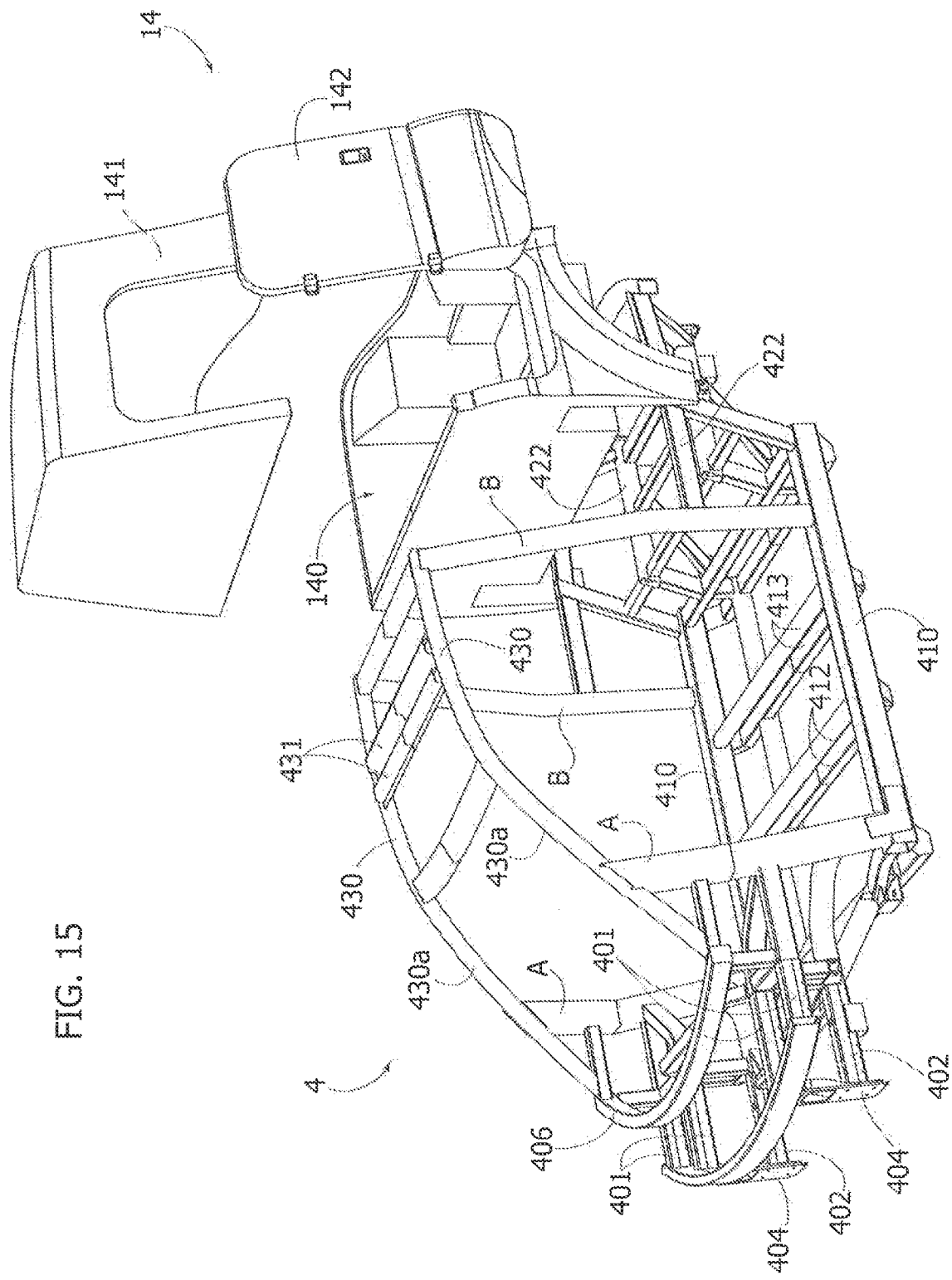
FIG. 15 is an exploded perspective view that illustrates the same elements as those of FIG. 14.
Figure 16:
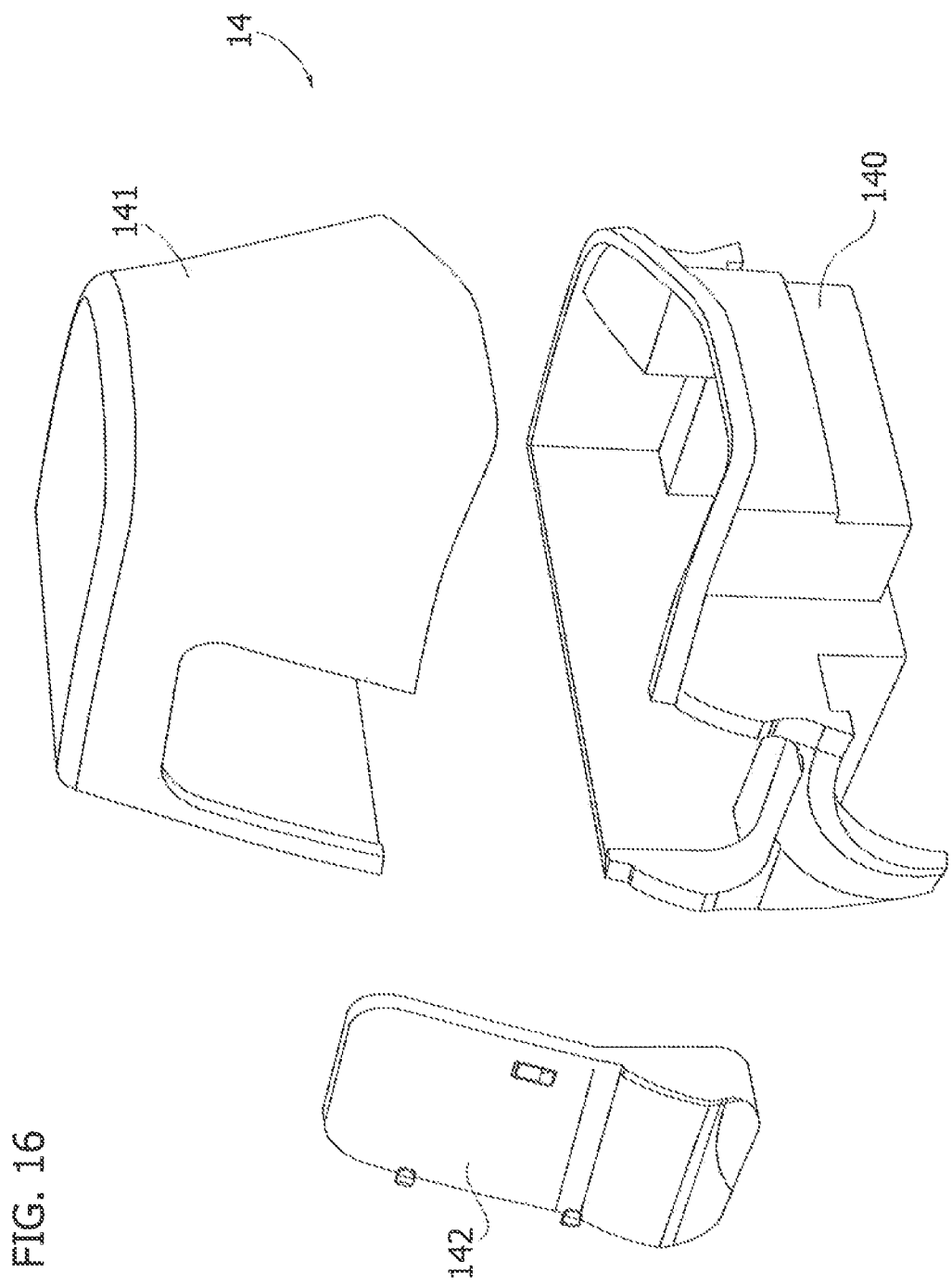
FIG. 16 is an exploded perspective view only of the assembly of the various elements constituting the body of the container.
Figure 17:
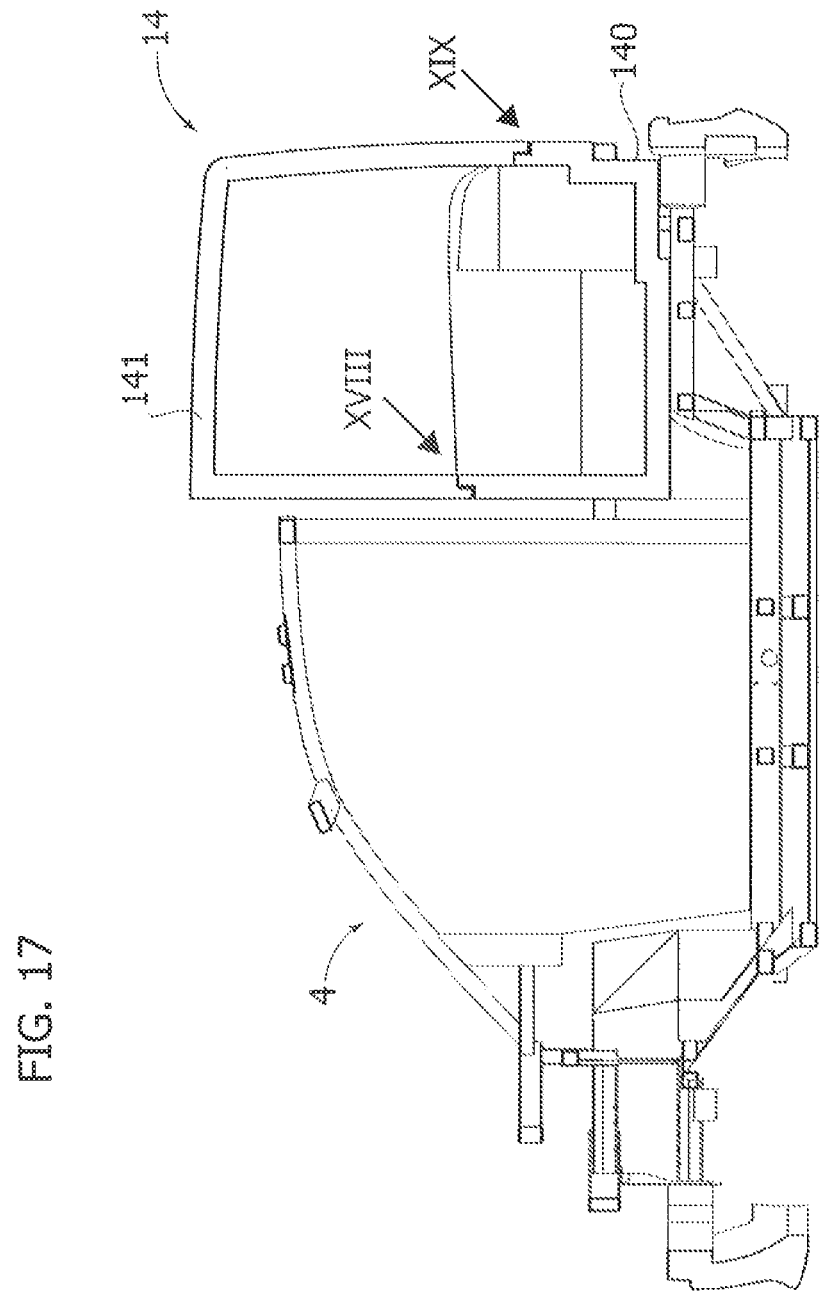
FIG. 17 is a side view of the frame of the motor vehicle with the body of the container.

As may be seen in FIGS. 15, 16, the transporting body 14 is constituted, in the example illustrated, by a bottom element 140, a top element 141, and a door 142 for access to a door compartment defined on one side of the body constituted by the two bottom and top elements 140, 141.

In a variant, it would be possible to provide only the bottom element of the transporting body 140 so as to create a version of motor vehicle of the pick-up type.

Figure 18:
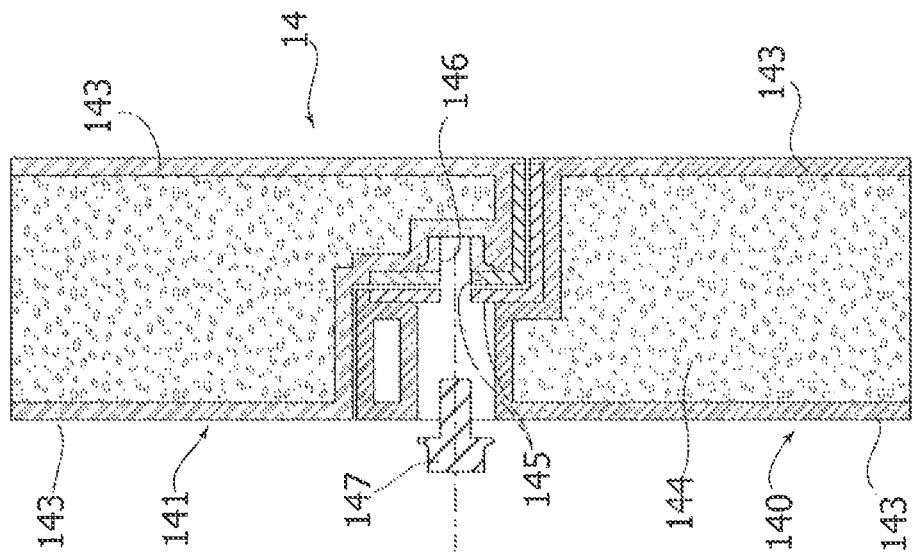
FIGS. 18 and 19 are cross-sectional views at an enlarged scale of the details XVIII and XIX of FIG. 17.
Figure 19:
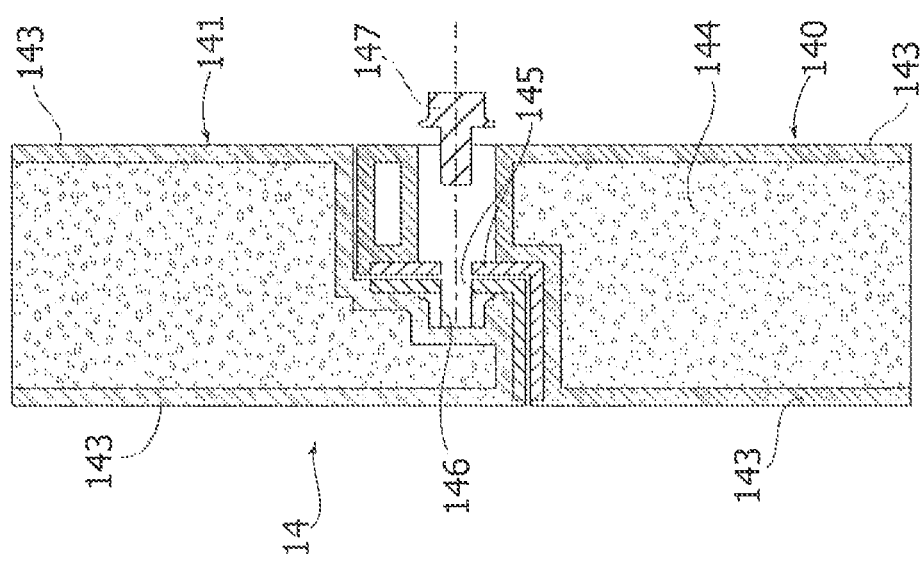

According to a preferred characteristic of the present invention, the body of the elements of the transporting body 140, 141 is made of plastic material and is obtained with the rotational-moulding technique, in such a way as to define, for each of these elements, a hollow body with a wall made of rigid plastic material 143, for example polyethylene, and a cavity 144 filled with foamed plastic material, for example polyurethane or aerogel (see FIGS. 18 and 19).

As may be seen in the detail of FIGS. 18 and 19, the bottom and top elements 140,141 have mutually engaging edges defining a labyrinthine-profile configuration, with an S-shaped profile to prevent any leakage of water into the transporting body 14. Moreover provided are attachment points for mutual connection of the elements 140, 141 at which embedded in the polyethylene wall 143 of the two elements 140, 141 are metal brackets 145 and threaded bushings 146 for connection using screws 147 (see FIGS. 18 and 19).

From the foregoing description it is evident that the invention achieves a series of important advantages.

First of all, the division into the subassemblies described above of the structure of the main frame 4 and the specific configuration described above of each of these subassemblies enables drastic simplification in the operations of manufacture and assembly together with an extremely high flexibility of production given that the aforesaid structure is suited for production of a large number of different versions and models of motor vehicle with simple and immediate adaptations of the structure and of the corresponding production equipment.

The use of lattice structures with arms constituted by box-section elements made of sheet steel, preferably high-strength steel, at the same time enables extremely good characteristics of sturdiness and sufficiently low production costs to be obtained, thus allowing even small-scale production. The specific structure described above of the front and rear frame subassemblies and in particular the provision of the struts 401, 402 arranged on two levels set on top of one another and at a distance apart, distributed along the width of the structure, enables a very high capacity of absorption of impact energy to be obtained for motor vehicles of this category.

Use of rotational-moulding technology (in the example of embodiment that makes use of a front bumper and rear bumper that englobe the cross member for connecting the struts designed for energy absorption, as well as in the example of embodiment that envisages use of a container body for transport of goods) proves extremely advantageous in so far as it enables elements to be obtained with the necessary qualities of sturdiness and at the same time good characteristics of lightness. Rotational-moulding technology is on the other hand perfectly compatible with the production of motor vehicles of this category, above all in the case of medium- or small-scale production.

Of particular importance is the embodiment that envisages use of a container body for transport of goods. As has been shown, the aforesaid transporting body has a structure that enables its production with extremely simple and low-cost operations. The same applies to the operations necessary for adapting the frame of the motor vehicle to receive the aforesaid transporting body, which once again demonstrates the extreme flexibility and economy of production that are afforded by the present invention. A further important advantage of the motor-vehicle structure described herein lies in the fact that it guarantees efficient and safe housing of the batteries for supplying the electric motor associated to one or both of the axle assemblies of the motor vehicle.

FIGS. 24-31 refer to a variant of the first embodiment of the invention. In these figures, the parts common to FIGS. 1-11 are designated by the same references.

The main difference as compared to the first embodiment lies in the fact that in this case the car has a single left front door, for access to a central driving seat, and a single right rear door, for access to the rear seats. This arrangement makes it possible to provide the uprights B in longitudinally staggered positions, with the right upright B set further back and the left upright B set further forward so as to be able to define door compartments wider than what would be possible if a front door and a rear door were arranged on one and the same side of the car. Of course, the arrangement could be reversed, providing a right front door and a left rear door.

Figure 24:
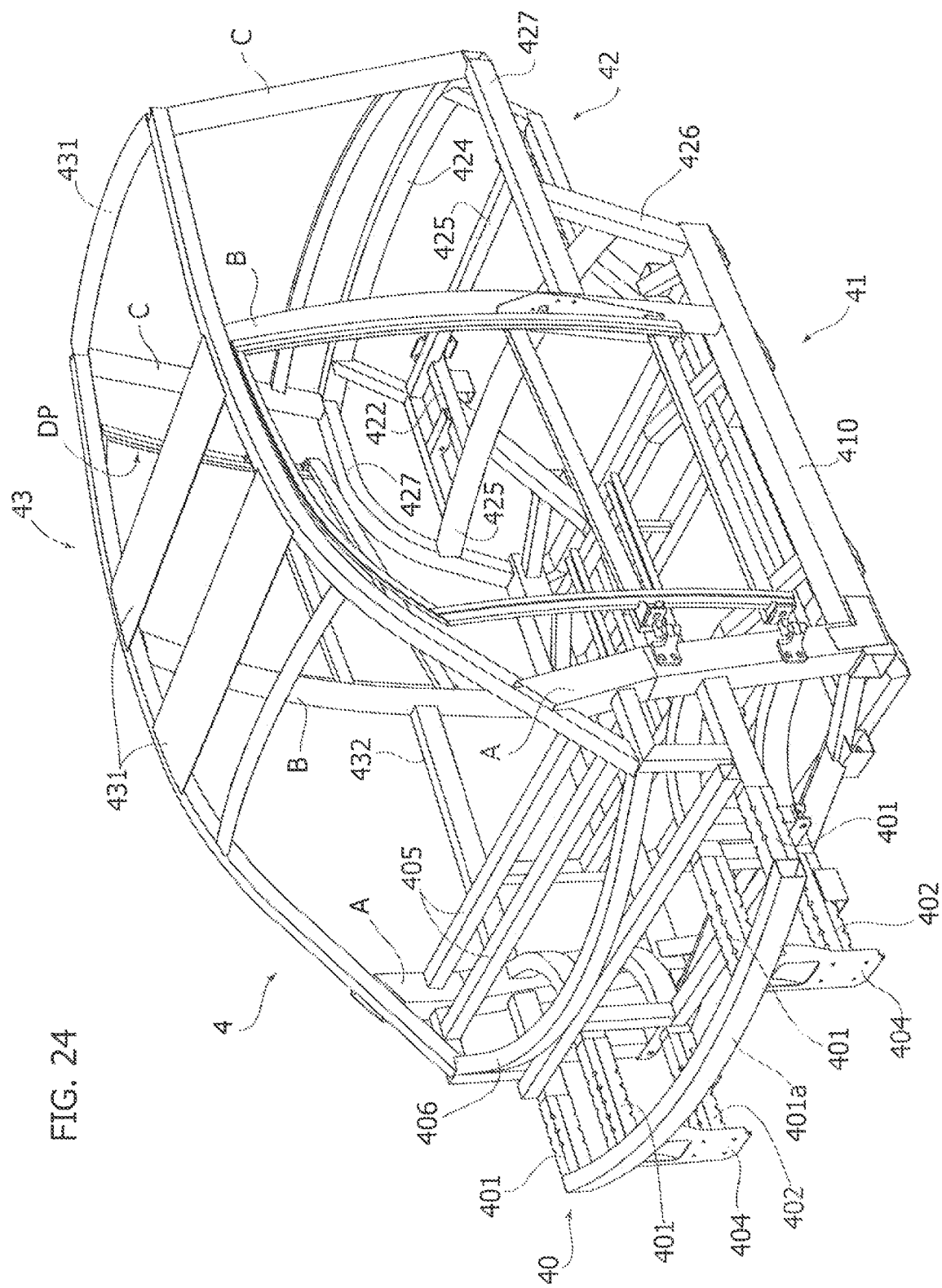
Figure 25:
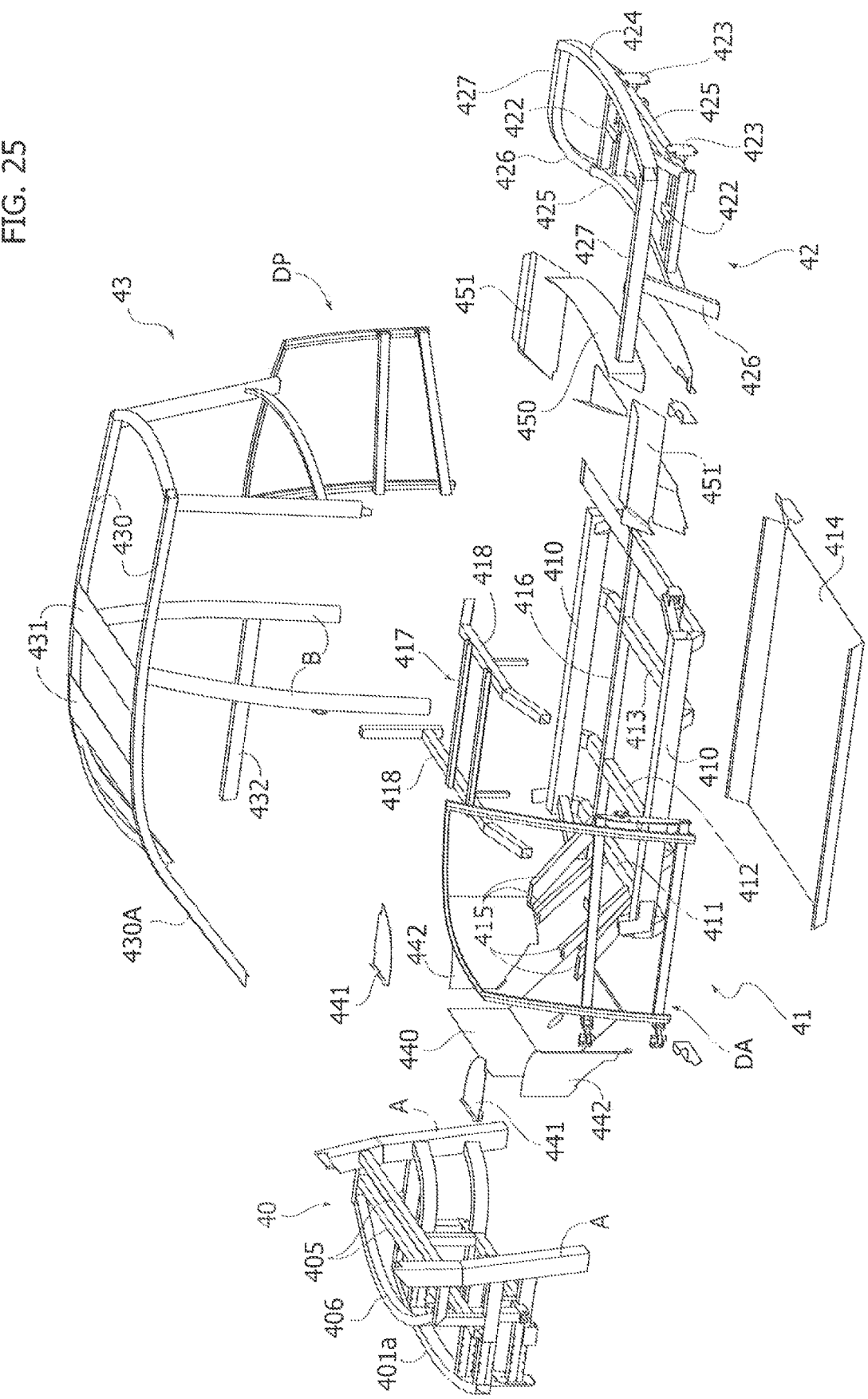
Figure 26:
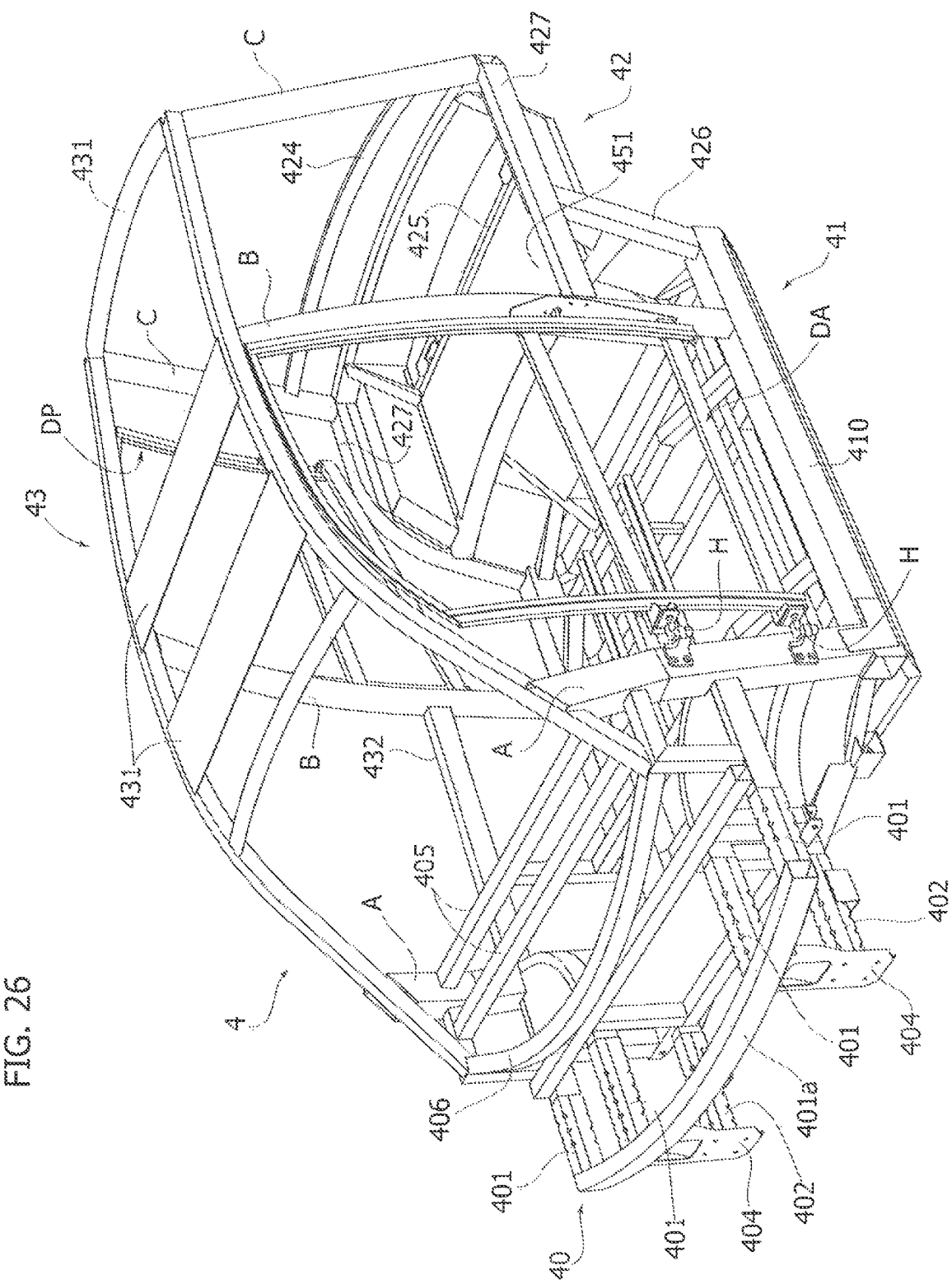
Figure 27:
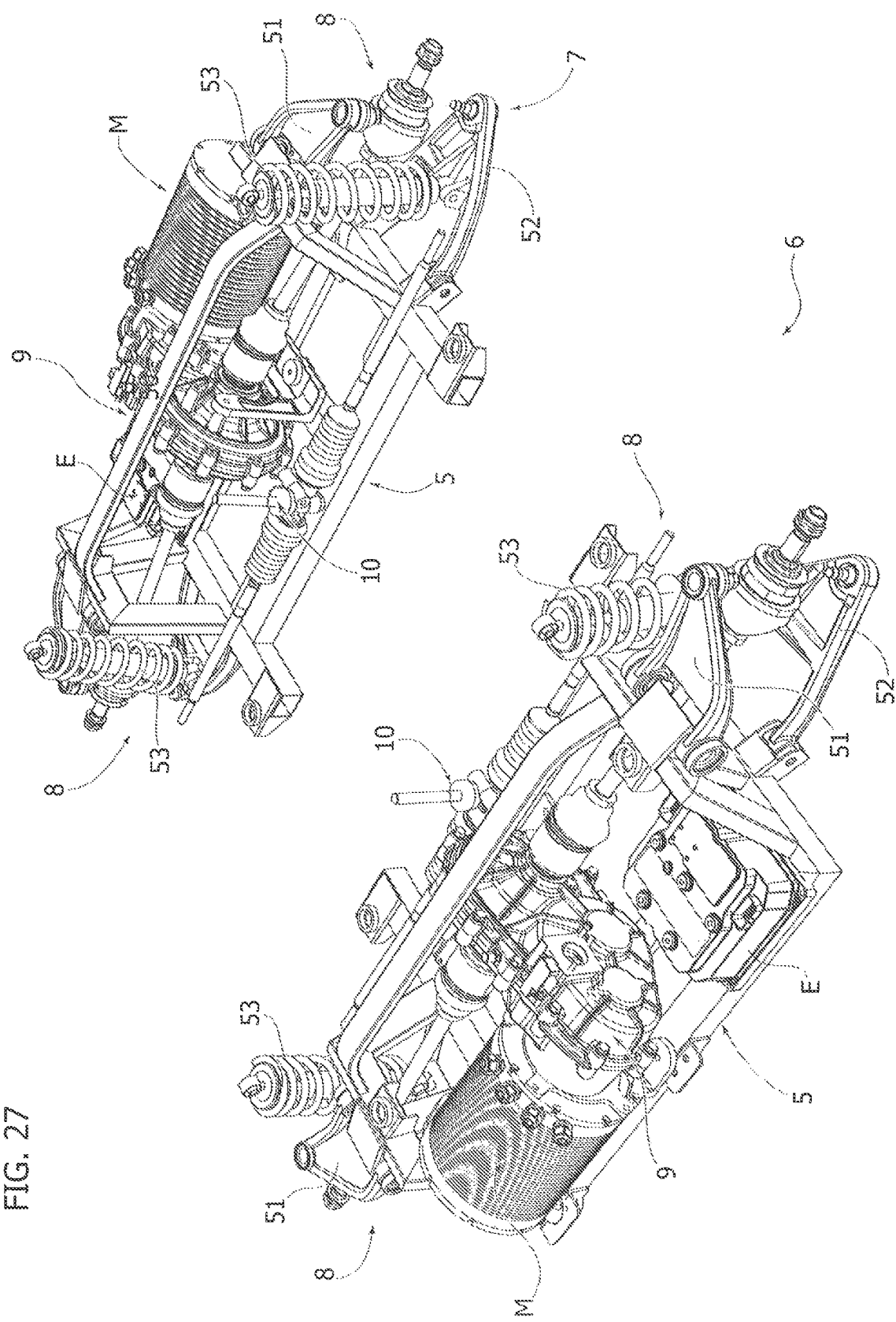
Figure 28:
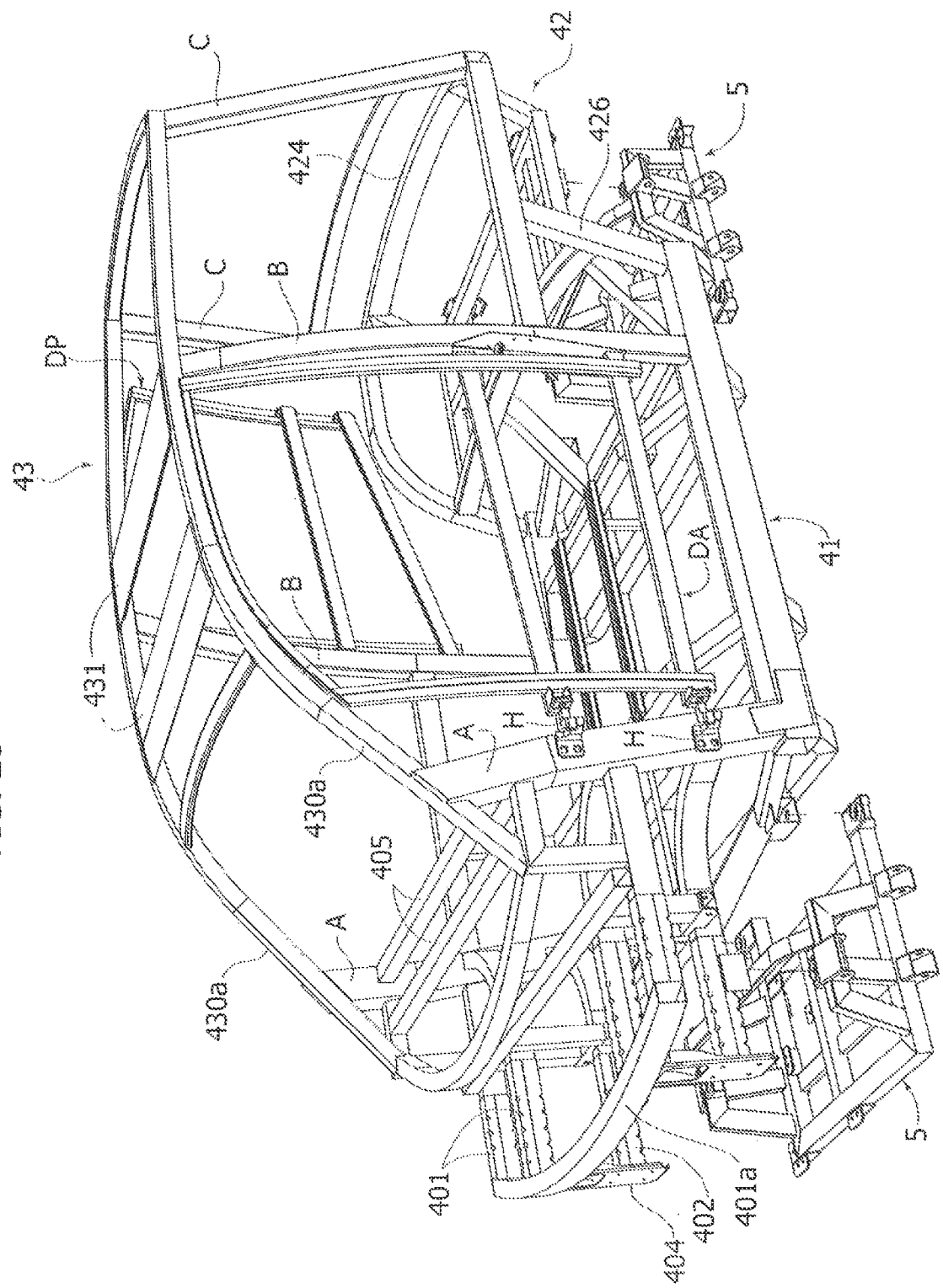
Figure 29:
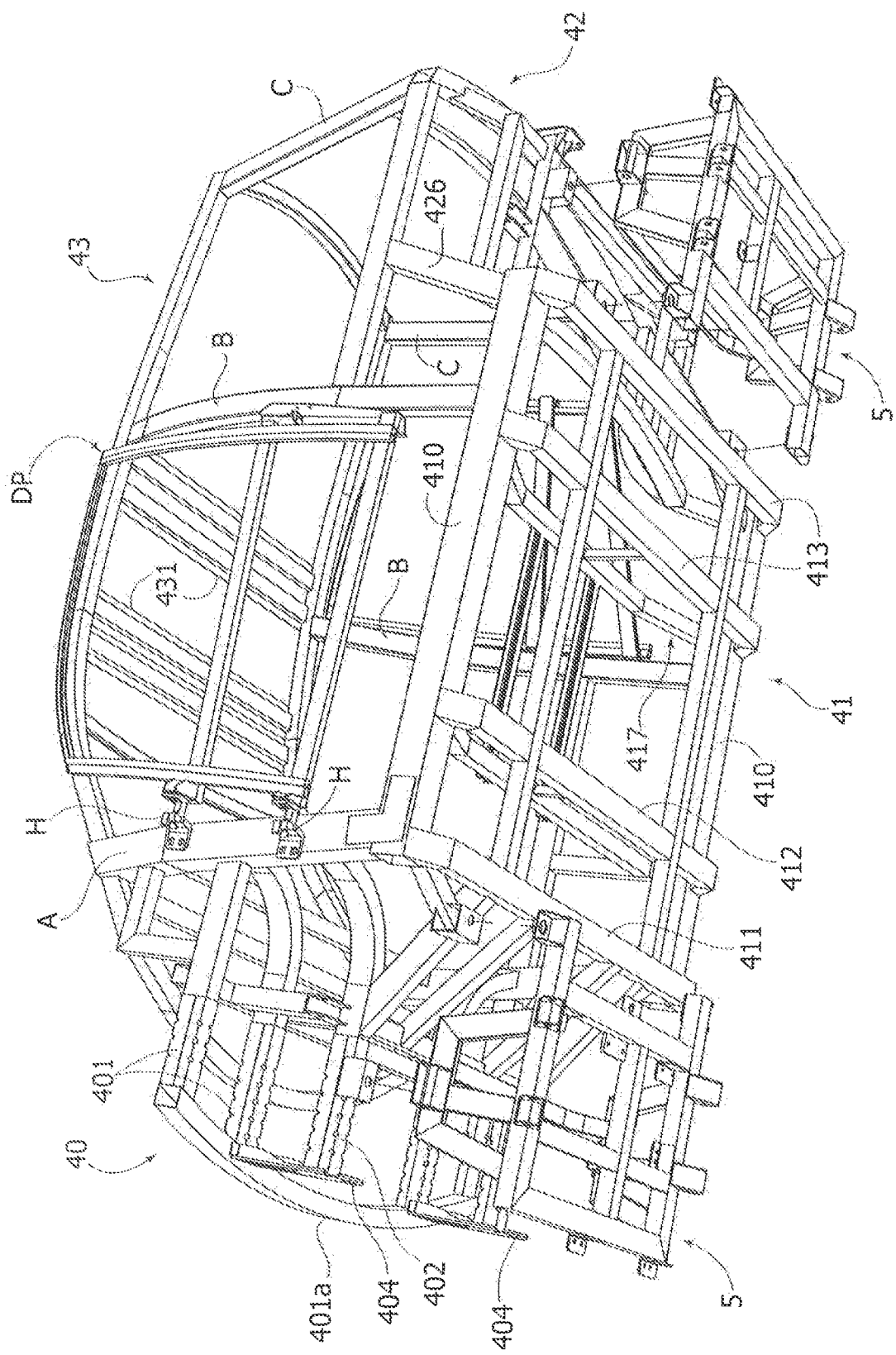
Figure 30:
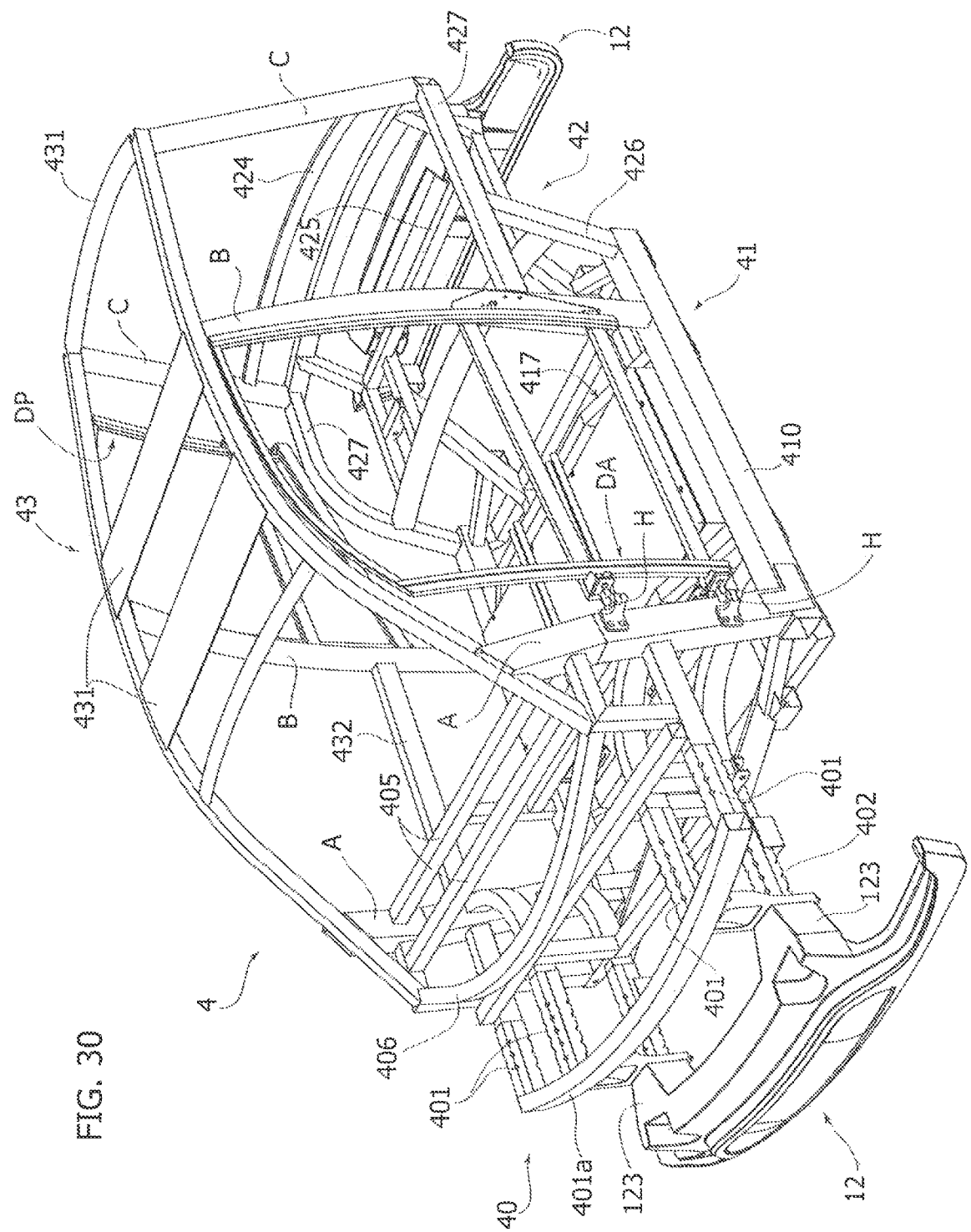

With reference in particular to FIGS. 24-26, the front subassembly 40 is substantially identical to that of FIG. 2, while the floor-panel subassembly 41 envisages a single series of cross members 411, 412, 413 which connect the two longitudinal members 410 and are designed to support a plate (not illustrated) for resting the batteries of the car. The metal sheet 414 in this case is a plane metal sheet. Mounted above the frame of the floor panel is a framework 417 (FIG. 25) for supporting the driving seat, comprising two cross members 418 with their central portions raised, for supporting a plate of sheet metal (not illustrated) that functions as raised resting surface for the driving seat in such a way as to leave the space underneath this surface free, for the feet of the passengers sitting in the rear seats. The rear subassembly 42 in this case has a structure that is not symmetrical with respect to the vertical median plane of the car on account of the asymmetrical arrangement of the side doors. The top subassembly 43 has in this case two uprights B that are longitudinally staggered, for the reasons already mentioned above, with the left upright B in a position set further back with respect to the right upright B. On the right side without front door a beam 432 is provided that extends longitudinally forwards starting from an intermediate portion of the right upright B and has its front end fixed to the right upright A. Finally, illustrated in FIGS. 24-26 are the left front-door frame DA, provided with hinges H, and the right rear-door frame DP. As has likewise already been said, in the case of motor vehicles designed for countries with left-hand driving, the structure of the frame of the motor vehicle could be specularly reversed with respect the one illustrated by swapping around the right-hand parts with the left-hand ones. In general, the intermediate upright B that is set on the side of the rear door is in a position longitudinally further forward than the intermediate upright B that is set on the side of the front door so as to enable door compartments of ample dimensions to be obtained.

Of course, without prejudice to the principle of the invention, the details of construction and the embodiments may vary widely with respect to what has been described and illustrated herein purely by way of example, without thereby departing from the scope of the present invention.

The invention claimed is:

1. An electrically powered motor vehicle for transport of goods, comprising:
   a main frame;
   a front axle assembly; and
   a rear axle assembly,
   wherein said axle assemblies each comprise an auxiliary supporting frame and two suspension units that connect two respective wheel supports to said auxiliary supporting frame, and
   wherein at least one of said axle assemblies is a motor-driven axle with steering wheels, further comprising, mounted on the respective auxiliary supporting frame, an electric motor for driving the wheels in rotation, a control unit of said motor, a transmission unit for transmission of motion from the electric motor to the wheels, and a steering device for steering the wheel supports,
   wherein said main frame includes:
      a front frame subassembly,
      a floor-panel subassembly,
      a rear frame subassembly, and
      a top frame subassembly,
   wherein each of said frame subassemblies comprises a lattice structure including box-section elements,
   said frame subassemblies being prearranged for being preassembled separately and subsequently assembled together to form the main frame,
   wherein said top frame subassembly is prearranged for incorporating the intermediate uprights of the motor vehicle that upstand from the floor panel assembly between the front frame assembly and the rear frame assembly and does not include parts that extend behind said intermediate uprights, and
   wherein fixed to said intermediate uprights and to the rear frame subassembly is a transporting body for transport of goods, the transporting body comprising at least one tank-shaped bottom element that bounds a compartment, the compartment being disposed entirely behind said intermediate uprights.

2. The motor vehicle according to claim 1, wherein the transporting body also comprises a top element applied on the bottom element so as to define a container that bounds an interior space, the container having a door compartment that communicates with the interior space, a door being movably mounted to the container so that the door can selectively open and close the door compartment.

3. The motor vehicle according to claim 2, wherein the bottom and top elements of the transporting body are made of plastic material and are configured such that each wall of the container has an internal cavity filled with foamed plastic material.

4. The motor vehicle according to claim 3, wherein the bottom and top elements of the transporting body have coupled edges defining engagement surfaces shaped according to a labyrinthine profile to prevent any entry of water into the transporting body.

5. The motor vehicle according to claim 4, wherein the co-operating edges of said top and bottom elements of the transporting body have attachment points, embedded in which are metal plates and respective threaded bushings for engagement of connection screws.

6. The motor vehicle according to claim 1, wherein the box-section elements—are made of steel.

7. The motor vehicle according to claim 2, wherein the top element of the transporting body projects above the top frame subassembly.

\* \* \* \* \*